US012277566B2

(12) United States Patent
Gimple

(10) Patent No.: US 12,277,566 B2
(45) Date of Patent: Apr. 15, 2025

(54) SYSTEMS AND METHODS TO OPTIMIZE AND RECONCILE DATA TRANSACTIONS

(71) Applicant: Confie Holding II Co., Huntington Beach, CA (US)

(72) Inventor: Jay K. Gimple, Stevenson Ranch, CA (US)

(73) Assignee: Confie Holding II Co., Huntington Beach, CA (US)

( * ) Notice: Subject to any disclaimer, the term of this patent is extended or adjusted under 35 U.S.C. 154(b) by 422 days.

(21) Appl. No.: 17/483,337

(22) Filed: Sep. 23, 2021

(65) Prior Publication Data

US 2022/0101322 A1   Mar. 31, 2022

Related U.S. Application Data

(60) Provisional application No. 63/126,410, filed on Dec. 16, 2020, provisional application No. 63/083,275, filed on Sep. 25, 2020.

(51) Int. Cl.
    *G06Q 20/40* (2012.01)
    *G06Q 20/10* (2012.01)

(52) U.S. Cl.
    CPC ......... *G06Q 20/405* (2013.01); *G06Q 20/108* (2013.01); *G06Q 20/4014* (2013.01); *G06Q 20/407* (2013.01)

(58) Field of Classification Search
    CPC .................................................... G06Q 40/00
    USPC ......................................................... 705/35
    See application file for complete search history.

(56) References Cited

U.S. PATENT DOCUMENTS

| 5,191,522 A * | 3/1993 | Bosco ................... G06Q 40/08 |
| | | 705/4 |
| 10,055,793 B1 * | 8/2018 | Call ....................... G06Q 10/10 |
| 10,137,984 B1 * | 11/2018 | Flick ..................... G08G 5/0039 |
| 10,387,966 B1 * | 8/2019 | Shah ...................... G06Q 40/08 |
| 11,068,644 B1 * | 7/2021 | Beiderman ........... G06F 40/174 |

(Continued)

OTHER PUBLICATIONS

PCT International Search Report and Written Opinion, PCT Application No. PCT/US21/51974, mailed Dec. 23, 2021.

*Primary Examiner* — Kirsten S Apple
(74) *Attorney, Agent, or Firm* — Rutan & Tucker LLP; Ravi Mohan

(57) ABSTRACT

Systems and methods for retrieving data transactions with a transactional data reconciliation device. The device may be triggered to retrieve the data transactions from data files associated with various carriers and financial institutions and available for processing. The data transactions may be associated with any commission, carrier, and banking data transactions. The retrieved data transactions may be used to generate transactional data files particular to the respective carriers and financial institutions. The generated files may be utilized to reconcile received carrier commissions against expected carrier commissions and reconcile such commissions against deposited transactions from the financial institutions. Furthermore, the generated files may be utilized to reconcile any carrier data transactions against any transactions from stored records of the carriers. Finally, the generated files may also be utilized to reconcile any deposited amounts retrieved from the banking data transactions against any commission amounts retrieved from the commission data transactions.

20 Claims, 9 Drawing Sheets

(56) References Cited

U.S. PATENT DOCUMENTS

| | | | |
|---|---|---|---|
| 11,328,363 B1* | 5/2022 | Brannan | G06Q 30/04 |
| 2002/0111835 A1* | 8/2002 | Hele | G07F 17/0014 |
| | | | 705/4 |
| 2004/0143464 A1* | 7/2004 | Houle | G06Q 10/10 |
| | | | 705/4 |
| 2005/0160031 A1 | 7/2005 | Hendrickson | |
| 2006/0129415 A1 | 6/2006 | Thukral et al. | |
| 2008/0065426 A1* | 3/2008 | Ziade | G06Q 40/08 |
| | | | 705/4 |
| 2008/0243556 A1 | 10/2008 | Hogan et al. | |
| 2009/0070237 A1 | 3/2009 | Lew et al. | |
| 2014/0136242 A1* | 5/2014 | Weekes | G06Q 40/08 |
| | | | 705/4 |
| 2014/0229205 A1* | 8/2014 | Gibson | G06Q 40/08 |
| | | | 705/4 |
| 2015/0348208 A1 | 12/2015 | Nordyke et al. | |
| 2019/0228473 A1* | 7/2019 | Tabbaa | G16H 15/00 |
| 2021/0166322 A1* | 6/2021 | Allen | G06Q 40/08 |
| 2022/0005121 A1* | 1/2022 | Hayward | G06N 3/044 |
| 2022/0092149 A1* | 3/2022 | Gimple | G06F 16/955 |

* cited by examiner

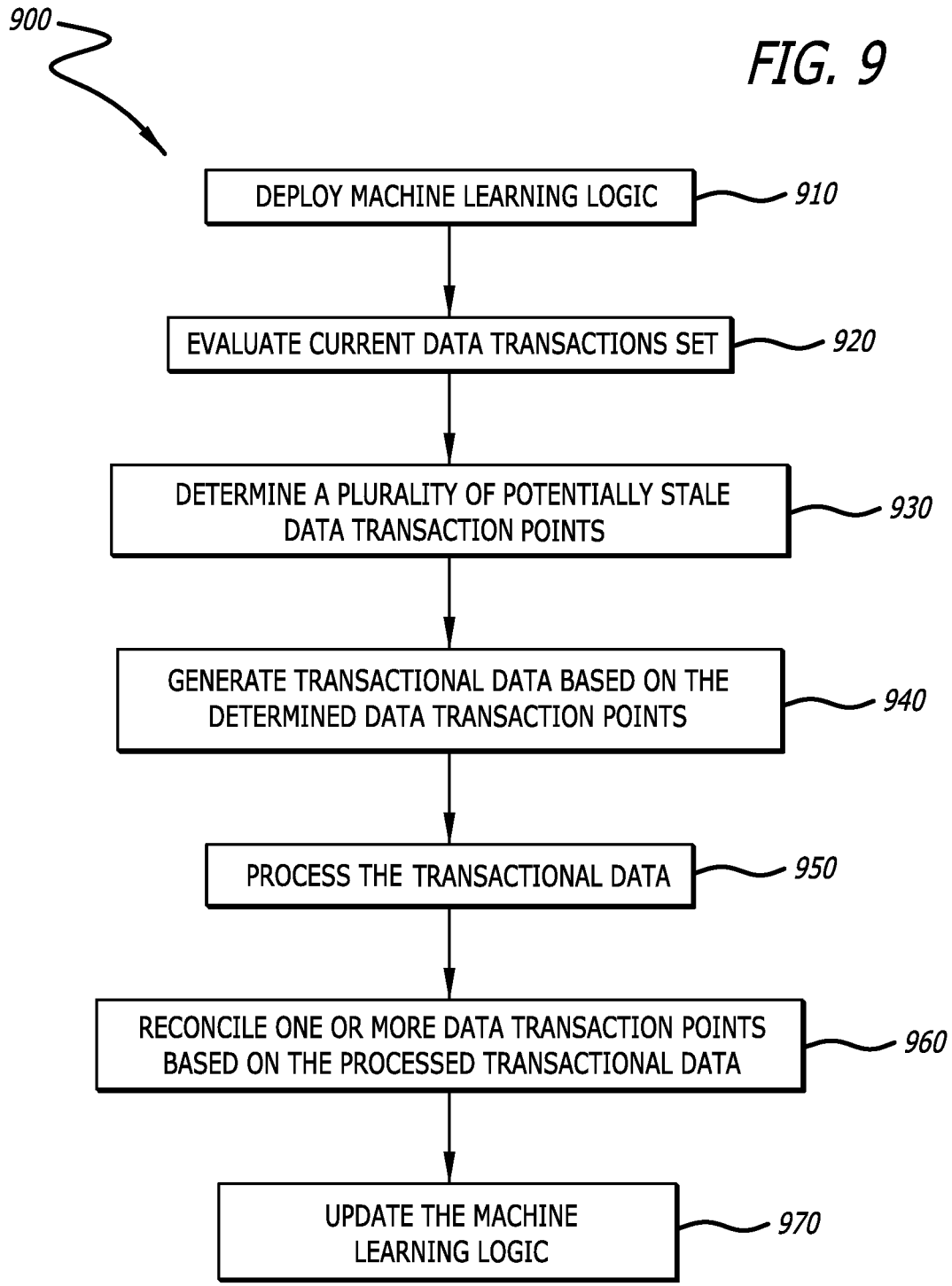

SYSTEMS AND METHODS TO OPTIMIZE AND RECONCILE DATA TRANSACTIONS

PRIORITY

This application claims the benefit of and priority to U.S. Provisional Application No. 63/126,410, filed Dec. 16, 2020 and U.S. Provisional Application No. 63/083,275, filed Sep. 25, 2020, both of which are incorporated in their entireties herein.

FIELD

The field of the present disclosure generally relates to the collection of insurance data transactions. More particularly, the present disclosure relates to retrieving data transactions from various carriers and financial institutions to optimize and reconcile specified transactional data based on the retrieved carrier and financial institution data transactions.

BACKGROUND

Insurance brokers typically act as intermediaries for their clients, which may be entities seeking insurance coverage for certain risks. The brokers bring prospective clients together with one or more insurance carriers who may be willing and able to provide the desired insurance policies and coverage on beneficial terms for their prospective clients. These insurance policies are typically provided by the insurance carriers and may be serviced through the brokers via agency management systems (AMSs). As a result, brokers and their AMSs may be dependent upon various insurance related data points provided by the carriers and/or handled by the financial institutions.

For example, a broker typically needs to collect multiple transactional and commission data transactions per multiple producer codes associated with an individual carrier. However, the process for collecting all the data transactions per all the producer codes from all the individual carriers is typically done manually with various processing teams related to the broker. A processing team for a broker may be responsible for collecting, converting, and accounting all the data transactions and all their data entries from all the individual carrier websites in response to the respective carriers acknowledging bank deposits and/or submitting audit requests.

However, due to the volume of carriers and multiple producer codes associated with each of the carriers, these processing teams typically encounter many obstacles as the manual collection of all available transactional and commission data transactions month after month accumulate into an insurmountable backlog and also leads to increases in data entry errors due to human error. Additionally, as insurance brokers grow through acquisition of other business entities, this manual process of collecting and accounting for all data transactions provided by all carriers and financial institutions does not scale proportionately and is prohibitive and costly.

BRIEF DESCRIPTION OF DRAWINGS

The above, and other, aspects, features, and advantages of several embodiments of the present disclosure will be more apparent from the following description as presented in conjunction with the following several figures of the drawings. The drawings refer to embodiments of the present disclosure in which:

FIG. 9 is a flowchart depicting a process for utilizing machine learning and artificial intelligence (AI) based processes in conjunction with a transactional data reconciliation device, in accordance with an embodiment of the present disclosure.

DETAILED DESCRIPTION

Figure 1:
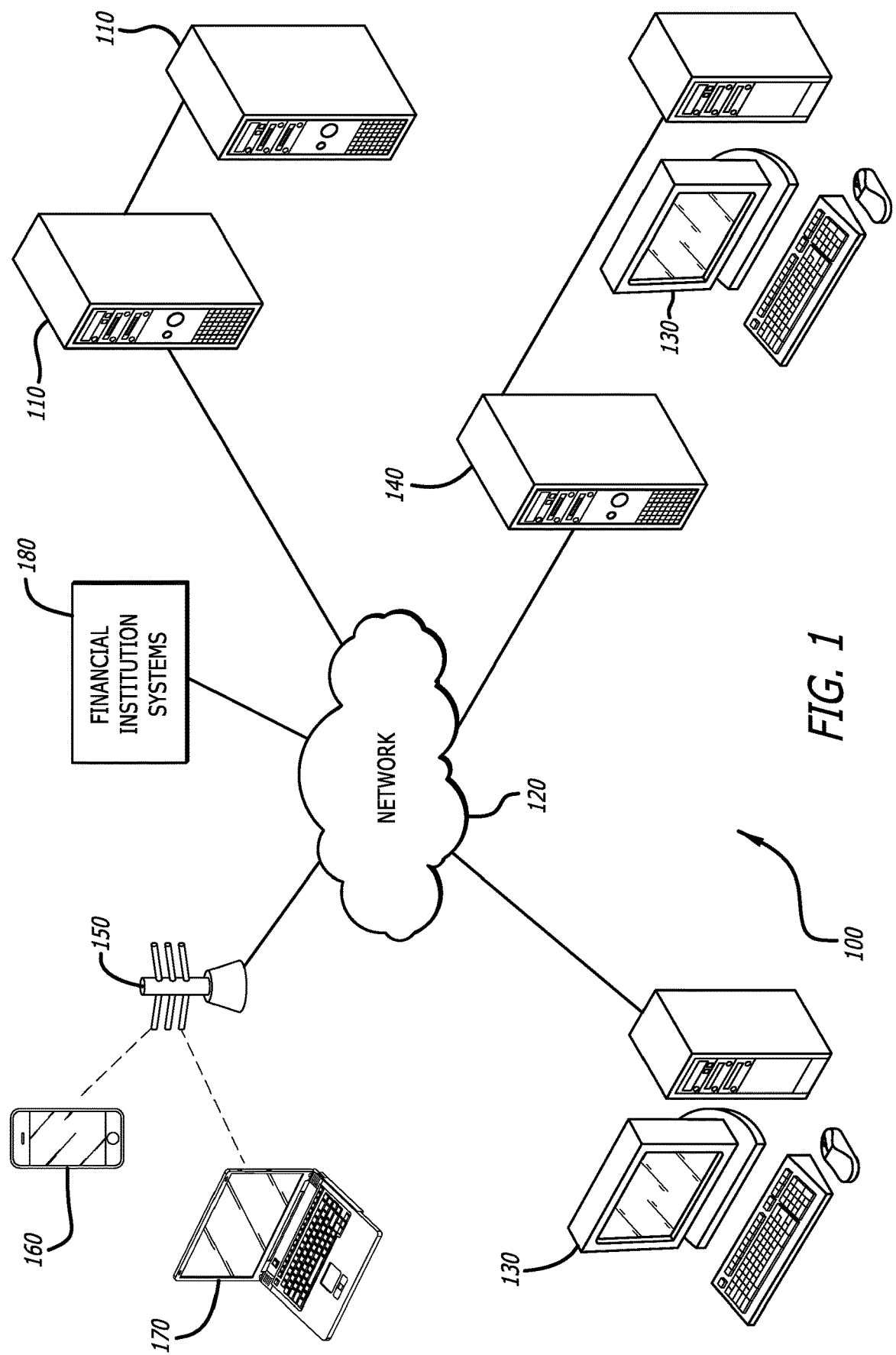
FIG. 1 is an exemplary illustration of a transactional data reconciliation system, in accordance with an embodiment of the present disclosure.

The embodiments described herein relate to systems and methods for retrieving data transactions and optimizing transactional data with a transactional data reconciliation device. As described in greater detail below, the embodiments particularly relate to systems and methods for retrieving data transactions from various carriers and financial institutions to optimize and reconcile specified transactional data based on the retrieved carrier and financial institution data transactions. In most embodiments, the various types of data transactions may be associated with commission data transactions (e.g., data transactions capable of being retrieved from a commission statement, a commission written record, etc.), carrier data transactions (e.g., data transactions capable of being retrieved from a carrier's transaction statement, a carrier's transactions written record, etc.), and banking data transactions (e.g., data transactions capable of being retrieved from a bank/financial statement, a banking/financing written record, etc.). Furthermore, in response to the technical problems described above regarding the difficulties of maintaining an accurate AMS in conjunction to collecting and accounting for all carrier and banking data transactions, embodiments of the transactional data reconciliation device are shown herein that depict processes for automatically anticipating the retrieval of specified data transactions from various carriers and financial institutions and optimizing the reconciliation of specified transactional data files based on all retrieved carrier and financial institution data transactions.

In addition, the embodiments described herein may utilize the generated transactional data files to reconcile any received commissions against any expected commissions and to also reconcile any received/expected commissions against deposited banking transactions from the financial institutions. Furthermore, the generated transactional data files may also be utilized to reconcile any carrier-related data transactions against any transactions stored in any systems of records associated with such carriers. Finally, the generated transactional data files may be further utilized to reconcile any deposited amounts retrieved from the financial data transactions against any commission amounts retrieved from the commission data transactions.

The embodiments of the data reconciliation device provide one or more specified manners of automatically communicating and retrieving data transactions from a wide variety of different insurance carrier/banking servers to thereby generate/transmit any specified carrier transactional data files based on any carrier/banking-related data transactions to an agency server of an insurance broker. Such embodiments provide one or more specific technical improvements over prior technical problems involved with insurance systems and their data collection processes as described above, resulting in an improved data reconciliation device for any insurance systems and devices. Specifically, such embodiments are integral in today's insurance systems to enable all insurance brokers and all their systems and customers with the ability to utilize these data reconciliation devices, systems, and processes described herein with their current infrastructures. This will allow them to reconcile any carrier-related data transactions to improve and further enhance their insurance customer experiences, and to also ensure them with a higher degree of transactional data quality for more accurate and complex data reporting on key business metrics.

Before some particular embodiments are provided in greater detail, it should be understood that the particular embodiments provided herein do not limit the scope of the concepts provided herein. It should also be understood that a particular embodiment provided herein may have features that may be readily separated from the particular embodiment and optionally combined with or substituted for features of any number of other embodiments provided herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise. Unless defined otherwise, all technical and scientific terms used herein have the same meaning as commonly understood by those of ordinary skill in the art.

Aspects of the present disclosure may be embodied as an apparatus, system, method, and/or computer program/application product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like. A component, as used herein, comprises a tangible, physical, non-transitory device. For example, a component may be implemented as a hardware logic circuit comprising custom circuits, gate arrays, or other integrated circuits; off-the-shelf semiconductors such as logic chips, transistors, or other discrete devices; and/or other mechanical or electrical devices.

A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In some embodiments, a circuit may include custom circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware or the like). A circuit may comprise one or more silicon integrated circuit devices (e.g., chips, die, die planes, packages, etc.) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

As used herein, reference to reading, writing, storing, buffering, processing, and/or transferring data may include the entirety of the data, a portion of the data, a set of the data, and/or a subset of the data. Likewise, reference to reading, writing, storing, buffering, processing, and/or transferring non-host data may include the entirety of the non-host data, a portion of the non-host data, a set of the non-host data, and/or a subset of the non-host data.

Further, aspects of the present disclosure are described below with reference to schematic flowchart diagrams and/or schematic block diagrams of methods, apparatuses, systems, and computer program/application products according to embodiments of the disclosure. It will be understood that each block of the schematic flowchart diagrams and/or schematic block diagrams, and combinations of blocks in the schematic flowchart diagrams and/or schematic block diagrams, may be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

Finally, in the following detailed description, reference is made to the accompanying drawings. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring now to FIG. 1, an illustration of a transactional data reconciliation system 100 is shown, in accordance with embodiments of the present disclosure. In various embodiments, the transactional data reconciliation system 100 may include one or more carrier management systems (CMSs) 110, one or more agency management systems (AMSs) 130, one or more transactional data reconciliation devices 140, and one or more financial institution systems 180. The transactional data reconciliation system 100 may communicatively couple one or more of the AMSs 130 and transactional data reconciliation devices 140 to one or more of the CMSs 110 over a network 120, such as the Internet and/or the like. Similarly, the transactional data reconciliation system 100 may communicatively couple one or more of the AMSs 130 and transactional data reconciliation devices 140 to the one or more financial institution systems 180 over the network 120.

In many embodiments, the transactional data reconciliation system 100 may be configured to retrieve commission, transaction, and/or banking data (i.e., transactional data) from the CMSs 110 and/or the financial institution systems 180. In addition, the transactional data reconciliation system 100 may be configured to respectively generate commission, transaction, and/or banking transactional data files based on the retrieved data from the CMSs 110 and/or the financial institution systems 180. In several embodiments, the transactional data reconciliation system 100 may utilize the transactional data reconciliation devices 140 to retrieve, automate, and process any data collection associated with the generated commission, transaction, and/or banking transactional data files. As depicted in FIG. 1, the one or more transactional data reconciliation devices 140 may be communicatively coupled to one or more of the AMSs 130, such that the AMSs 130 may be capable of assessing and utilizing the retrieved, optimized, and processed transactional data provided by the transactional data reconciliation devices 140.

In many embodiments, the AMSs 130 may be any type of agency management systems capable of retrieving and optimizing transactional data and being used by any of insurance agents, brokers, and/or the like. The AMSs 130 may be utilized by insurance agents and/or brokers acting as intermediaries for their clients, which may be entities seeking insurance coverage for certain risks. The insurance agents/brokers may bring prospective clients together with one or more insurance carriers who may utilize the CMSs 110 to provide the desired insurance policies and coverage on beneficial terms for their prospective clients. For example, these insurance policies may be typically issued by the one or more insurance carriers associated with the CMSs 110 and may be serviced through the insurance agents/brokers associated with the AMSs 130 and/or transactional data reconciliation devices 140. In many embodiments, the AMSs 130 may transmit and receive insurance data to/from the CMSs 110, where the insurance data may include agency data, carrier data with producer codes data, and/or transactional data such as carrier commission data, carrier transaction data, carrier banking data, and so on.

In many embodiments, the CMSs 110 may be any type of carrier management systems capable of providing carrier commission and transaction data and being used by any of insurance carriers and/or the like. The CMSs 110 may be configured to function as, or be in communication with, a web server that may provide methods for clients to directly interact and add insurance data to the CMS 110. For example, a client or customer may communicate with the CMS 110 through any type of known user computing devices such as a laptop 170, a mobile computing device 160, and so on, which may communicate directly over the network 120 and/or through one or more wireless access points 150. The known user computing devices may be any type of computing devices capable of being used by the client/customer, which may include, but are not limited to, a personal computer (PC), a laptop computer, a mobile device, a tablet computer, a smart watch, a personal digital assistant device (PDA), a handheld communications device, a vehicle computer system, an embedded system controller, a consumer electronic device, any combination thereof, etc.

In several embodiments, the financial institution systems 180 may be any type of financial-based systems capable of providing financial institution data and transactional data and being used by any of the CMSs 110, AMSs 130, and/or transactional data reconciliation devices 140, where the financial institution data and transactional data may include data related to client account data, bank data, bank account numbers data, banking data, agency data, carrier data, any combinations thereof, and so on. The financial institution systems 180 may be comprised of, but not limited to, banking systems such as commercial banks systems, cooperative banks systems, etc., premium finance systems, credit union systems, depository institution systems such as loan providing systems, trust companies systems, mortgage loan systems, etc., contractual institutions systems such as insurance companies systems, pension funds systems, etc., investment institution systems such as investment banking systems, underwriting systems, brokerage firms systems, etc., banking repositories/systems, third party financing systems, any combination thereof, and/or any other financing based systems.

Any of the CMSs 110, the AMSs 130, and the financial institution systems 180 may be configured to generate and provide financial transactional data (i.e., transactional data), where the financial transactional data may include written records that convey the business activities and the financial performance of any particular client, company, customer, carrier, bank, investment, etc. These financial transactional data may often be audited by government agencies, accountants, firms, etc. to ensure accuracy and for tax, financing, and/or investing purposes. Financial transactional data may include, but are not limited to, commission transactional data, carrier transactional data, banks transactional data, balance sheets, income transactional data, cash flow transactional data, etc. In many embodiments, the transactional data generated and provided by any of the one or more CMSs 110, AMSs 130, and financial institution systems 180 may be exceptionally critical to any of the other respective CMSs 110, AMSs 130, and financial institution systems 180. As such, the transactional data needs to be accurately reflected, issued, and collected, such that the transactional data may be effectively retrieved and optimized by, for example, the transactional data reconciliation device 140.

In some embodiments, the transactional data reconciliation system 100 may utilize and configure the transactional data reconciliation devices 140 to automate the retrieval and importation of a plurality of commission transactional data from the CMSs 110. For example, any of the AMSs 130 may utilize the transactional data reconciliation devices 140 to reconcile against what gets deposited into any particular financial institutions, such as any particular banks associated with the particular AMS 130, as well as reconcile the total commissions received against the total commissions expected. In some embodiments, the transactional data reconciliation devices 140 may be triggered to retrieve (or collect, query, etc.) commission transactional data in response to when such commission transactional data are made available by a particular carrier associated with the CMSs 110.

Furthermore, in many embodiments, all commission transactional data for all producer codes may be collected on a regular monthly basis by the transactional data reconciliation devices 140. For example, each carrier of the CMSs 110 may provide a particular commission transactional data associated with a particular producer code that writes or has policies with that particular carrier of the CMSs 110. Each producer code may be a unique identification number assigned to a particular client of a particular carrier, which may be used to track each of the individual users and/or business entities associated with that particular client. This retrieval and reconciliation process facilitated by the transactional data reconciliation devices 140 may drastically reduce the human error component that is generally faced when collecting and gathering data from multiple transactional data from various carriers with various producer codes. At the same time, this retrieval and reconciliation process may further provide scalability as the volume of business may rapidly increase for any particular agency and/or brokerage associated with the AMSs 130. In addition, the transactional data reconciliation devices 140 may be further configured to select particular parameters used to retrieve particular data from the commission transactional data, to make particular adjustments to the retrieved data, and to apply one or more particular business rules to the retrieved data that helps to enhance the overall collected data used for downstream processes. For example, this may help to facilitate the downstream processes implemented to reconcile the actual commissions received by the AMSs 130 to those commissions actually expected by the AMSs 130 based on any agreement contracts or the like made with the carriers of the CMSs 110 and those commissions deposited into the particular financial institutions of the AMSs 130, such as the one of the financial institutions associated with the financial institution systems 180.

In some embodiments, the transactional data reconciliation system 100 may also utilize and configure the transactional data reconciliation devices 140 to automate the retrieval and importation of a plurality of carrier transactional data from the CMSs 110. For example, any of the AMSs 130 may utilize the transactional data reconciliation devices 140 to reconcile any transactional data related data retrieved from the carrier transactional data provided by the carriers of the CMSs 110 against the carrier transactional data stored in their respective system of records. Furthermore, in many embodiments, the transactional data reconciliation devices 140 may be configured to enable the AMSs 130 to collect additional transaction information and data from the retrieved data of the transactions transactional data that may not be represented in any of the processed and/or downloaded transactional data files provided by the carriers of the CMSs 110.

In most embodiments, the carrier transactional data may be retrieved and optimized by the transactional data reconciliation devices 140 to reconcile any particular downloaded files (e.g., AL3 format files and/or any other compatible format files) received from any of the carriers of the CMSs 110, and to update the AMSs 130 to ensure that all of the necessary transaction updates are properly accounted for in the respective systems of records of the AMSs 130. These proactive measures by the transactional data reconciliation devices 140 may ensure a higher degree of data quality that may be used by any of the agents/brokers of the AMSs 130 to create better and more accurate reporting on key business metrics. For example, better quality and more accurate data may translate to better customer experience with call centers, retail locations, and/or the like that may be associated with any of the AMSs 130. Furthermore, one or more carriers of the CMSs 110 may offer several additional transaction type data within the carrier transactional data, such as payment information, that may not be offered in the available downloadable format files, such as the payment information that is not typically a valid transaction type. As such, in several embodiments, the transactional data reconciliation devices 140 may be configured to use this payment information to better engage client, customers, and/or the like. For example, the transactional data reconciliation devices 140 may be configured to leverage machine learning and AI processes to generate predictive models, which may be used by the AMSs 130 to identify when a particular client, customer, etc., looks like they may drop off from their insurance policy, and to therefore proactively engage the particular client/customer before they drop off to increase and improve customer retention.

In other embodiments, the transactional data reconciliation system 100 may further utilize and configure the transactional data reconciliation devices 140 to automate the retrieval and importation of a plurality of banking data transactions from the financial institution systems 180. For example, any of the AMSs 130 may utilize the transactional data reconciliation devices 140 to reconcile the banking deposits from any of the financial institution systems 180 against the commission amounts on the commission transactional data that are received from the carriers of the CMSs 110. This retrieval, optimization, and reconciliation processes facilitated by the transactional data reconciliation devices 140 may insure a timely and consistent collection of these banking data transactions from all of the financial institutions 180, which may be additionally useful downstream by any of the agents/brokers of the AMSs 130 for reconciliation purposes and/or the like.

The transactional data reconciliation devices 140 may be implemented by the transactional data reconciliation system 100 to facilitate any of the one or more AMSs 130, CMSs 110, and/or financial institution systems 180. As depicted below in greater detail, the transactional data reconciliation device 140 may be implemented with one or more different configurations based on the desired design and/or application. For example, the transactional data reconciliation devices 140 may be implemented as a computing device having an internal browser-based application and configured to be system agnostic, which enables the computing device to therefore have the processing capabilities needed to retrieve any transactional data related data from any CMSs 110, AMSs 130, and/or financial institution systems 180. That is, the transactional data reconciliation devices 140 may be configured as an agnostic system which makes it capable of querying any of the CMSs 110 and/or financial institution systems 180, and/or configured as a generalized web scraping application which makes it capable of processing one or more websites linked to the CMSs 110 and/or financial institution systems 180. In certain embodiments, the transactional data reconciliation devices 140 may be configured to particularly provide data processing, data storage, data retrieval, data collection, data digitalization, and/or data automatization required by any of the AMSs 130. It should be understood that any transactional data reconciliation devices 140 may be utilized by any devices, data stores, systems, and related methods of the transactional data reconciliation system 100 to respectively retrieve and automate any particular type of data, without limitation.

As described above, the transactional data reconciliation devices 140 may be implemented by one or more agents/brokers of the AMSs 130 to retrieve and automate any transactional data related data directly from any of the CMSs 110 and/or financial institution systems 180. For example, this retrieval and reconciliation process may occur periodically and/or be triggered by an external command, a predetermined threshold, and/or the like. In some embodiments, access to one or more of the CMSs 110 and/or financial institution systems 180 may be enhanced through connections with agent/broker-specific portals and/or webpages. These webpages may be pre-existing and/or may be configured to interact directly with the transactional data reconciliation devices 140. In certain embodiments, access to these webpages may be restricted to particular agents/brokers associated with the transactional data reconciliation devices 140 and/or the AMSs 130, who may have the required credentials to access and be authenticated by the any of the particular CMSs 110 and/or financial institutions 180.

Furthermore, in response to being authenticated to access these restricted webpages, the transactional data reconciliation devices 140 may be configured to evaluate any transactional data associated with the respective CMS 110 and/or financial institution systems 180. In various embodiments, the transactional data reconciliation devices 140 may also be configured to determine whether the evaluated transactional data has been configured to be scrapped. In some embodiments, the transactional data reconciliation devices 140 may be further configured to process and/or convert one or more files based on the evaluated transactional data if such data is not capable of being scrapped. Finally, in most embodiments, the transactional data reconciliation devices 140 may be configured to generate one or more transactional data files based on at least one of the evaluated transactional data, the processed transactional data, and the converted transactional data. Although commission, transaction, and banking files are the only particular transactional data files discussed with regards to FIG. 1, it should be understood that any type of transactional data files and/or written records may be retrieved by the transactional data reconciliation device 140, without limitation.

Also, although the one transactional data reconciliation device 140 in FIG. 1 is depicted as being physically separated from the one AMS 130, it should be understood that any type of configurations may be implemented and utilized by any transactional data reconciliation devices 140, without limitation. For example, it should be understood that any embodiments may comprise a transactional data reconciliation device as a software-based application that may be operated from within any of the one or more AMSs 130. Indeed, in some embodiments, the transactional data retrieval and reconciliation process performed by the transactional data reconciliation device 140 may be carried out as a remote-based service or may be configured to operate directly on any of the CMSs 110, financial institution systems 180, and/or any desired user computing devices, such as the mobile computing device 160, the laptop 170, and so on. As such, it should be understood that any operations of the transactional data reconciliation device 140 may be implemented with any configurations and any number of devices, systems, etc., based on the desired design and/or application, without limitation.

Figure 2:
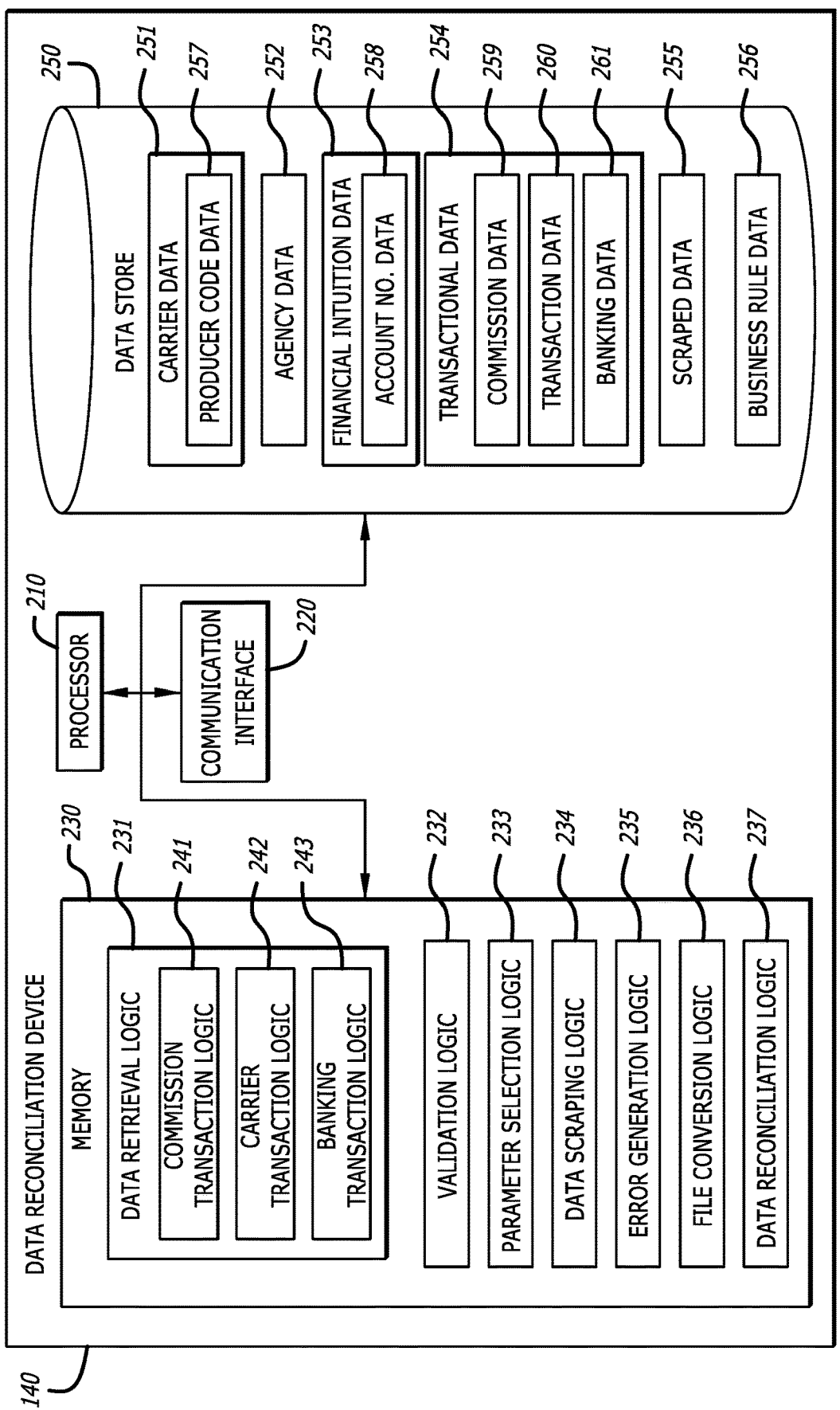
FIG. 2 is a detailed illustration of a transactional data reconciliation device, in accordance with an embodiment of the present disclosure.

Referring now to FIG. 2, an illustration of a transactional data reconciliation device 140 is shown, in accordance with embodiments of the present disclosure. In many embodiments, the transactional data reconciliation device 140 (also referred to as a data reconciliation device) may include a processor 210, a communication interface 220, a memory 230, and a data store 250. The transactional data reconciliation device 140 depicted in FIG. 2 may be substantially similar to the transactional data reconciliation device 140 depicted in FIG. 1. For example, the transactional data reconciliation device 140 may be communicatively coupled to one or more AMSs, CMSs, and financial institution systems as depicted in FIG. 1 in conjunction with any other additional devices, systems, and/or networks. This allows the transactional data reconciliation device 140 to be configured to retrieve transactional data from any of those CMSs and/or financial institutions systems and to automate the retrieved transactional data based on one or more selected parameters and applied business rules, which may be specified to the particular CMS and/or financial institution systems that issued the particular transactional data.

In some embodiments, the transactional data reconciliation device 140 may be embodied as a unique computing device which may be communicatively coupled to at least one of the CMSs 110, AMSs 130, and financial institution systems 180 as depicted in FIG. 1. In certain embodiments, the transactional data reconciliation device 140 may be configured within an AMS, a CMS, and/or any other similar computing devices/systems either as one or more hardware devices, one or more software modules, any combination thereof, and/or the like. In other embodiments, the transactional data reconciliation device 140 may be configured as a software application such as an internal browser-based application which may be implemented to run on any type of computing devices.

As shown, the transactional data reconciliation device 140 may include the processor 210 coupled to the communication interface 220. The communication interface 220 may enable the transactional data reconciliation device 140 to communicate with any external network devices and/or other network appliances. For example, the communication interface 220 may be in communication with a communication interface, device, appliance, etc., in one of the CMSs 110 and financial institutions systems 180 to query and retrieve transactional data from data store(s) associated with the respective system. In some embodiments, the communication interface 220 may be communicatively coupled to data reconciliation logic 237 within the memory 230 to perform communicative operations for querying, retrieving, and transmitting data via the communication interface 220, which ultimately allows the transactional data reconciliation device 140 to communicate with any desired devices, systems, and network appliances over a network similar to the network 120 depicted in FIG. 1.

In some embodiments, the communication interface 220 may be implemented as a physical interface including one or more ports for wired connectors and/or the like. Furthermore, or in alternative embodiments, the communication interface 220 may be implemented with one or more radio units for supporting wireless communications with other electronic devices, systems, and networks. For example, the transactional data reconciliation device 140 may be communicatively coupled to any type of external computing devices including, but not limited to, servers, data stores, cloud computing servers/services, and so on.

The transactional data reconciliation device 140 may have the processor 210 communicatively coupled to the memory 230. The memory 230 may be a persistent storage that may store one or more logics 231-237, 241-243 as software modules used to implement one or more operations of the transactional data reconciliation device 140. For example, the one or more logics and software modules of the memory 230 may include a data retrieval logic 231, a validation logic 232, a parameter selection logic 233, a data scraping logic 234, an error generation logic 235, a file conversion logic 236, and a data reconciliation logic 237, where the data retrieval logic 231 may further include an commission transactions logic 241, a carrier transactions logic 242, and a banking transactions logic 243. The operations of these software modules, upon execution by the processor 210, are depicted herein. Of course, it should be understood that some, or all, of the logics may be implemented as hardware, and if so, such logic may be implemented separately from each other, without limitation.

The transactional data reconciliation device 140 may also include the processor 210 and/or the memory 230 coupled to the data store 250. The data store 250 may include various types of data such as, but not limited to, carrier data 251, agency data 252, financial institution data 253, transactional data 254, scraped data 255, and business rule data 256, where the carrier data may further include producer code data 257, the financial institution data 254 may further include bank account numbers data 258, and the transactional data 254 may further include commission data 259, carrier transaction data 260, and banking data 261. It should be understood that any number of data types and logics may be configured in any number of configurations based on the desired design/application, which may include combining, omitting, and/or adding data types and logics, without limitations.

In most embodiments, the data retrieval logic 231 may be configured to perform various data retrieval processes in conjunction with other transactional data related processes. For example, the data retrieval processes may include retrieving a plurality of commission transactional data, a plurality of carrier transactional data, and a plurality of bank transactional data from at least one or more carriers, financial institutions, and so on. In addition, according to most embodiments, the data retrieval processes may include retrieving a commission transactional data for each producer code for each carrier, a carrier transactional data for each producer code for each carrier, and a bank transactional data for each bank account number for each financial institution.

According to several embodiments, the data retrieval logic 231 may be configured—in conjunction with the commission, transaction, banking transactions logics 241-243 and/or any other available logics 232-237—to retrieve, evaluate, select, and/or process any transactional data related data, such as, but not limited to, the commission, transaction, and banking data 259-261 of the transactional data 254 stored within the data store 250. For example, the data retrieval logic 231 along with the data reconciliation logic 237 may both be implemented to reconcile: any commissions received against any commissions expected from any carriers against what gets deposited into any particular financial institutions; any transactional data related data retrieved from any carrier transactional data against what is stored in any particular system of records of any particular carriers; and/or any bank transactional data deposits from any financial institutions against any particular commission amounts on any particular commission transactional data received from any particular carriers. In several embodiments, the data retrieval logic 231 may be triggered to retrieve (or collect, query, gather, etc.) various types of transactional data in response to such transactional data being made available by any carriers, financial institutions, and so on.

In some embodiments, the data retrieval logic 231 may include the commission transactions logic 241, which may be configured to initiate a commission data transactions retrieval process from one or more carriers of one or more CMSs at a predetermined time period. For example, this may include initiating the commission data transactions retrieval process on a daily schedule and/or any other desired schedule. The commission transactions logic 241 may be further configured to identify carriers from the one or more carriers of the one or more CMSs that have commission transactional data(s) available for downloading (or the like) at that predetermined time period—and to then add the identified carriers to a list of carriers (e.g., a list of first carriers). In some embodiments, the commission transactions logic 241 may also be configured to retrieve a list of producer codes (e.g., a list of first producer codes) for each carrier from that list of carriers. For example, this retrieved list of producer codes by the commission transactions logic 241 may be stored within the producer code data 257 of the carrier data 251 and may also be utilized to generate the commission data 259 of the transactional data 254.

In some embodiments, the data retrieval logic 231 may also include the carrier transactions logic 242, which may be configured to initiate a carrier data transactions retrieval process from one or more carriers of one or more CMSs at a predetermined time period. For example, similar to the commission data transactions retrieval process discussed above, this may include initiating the carrier data transactions retrieval process on a daily schedule and/or any other desired schedule. The carrier transactions logic 242 may be further configured to identify carriers from the one or more carriers of the one or more CMSs that have carrier transactional data(s) available for downloading (or the like) at that predetermined time period—and to then add the identified carriers to a list of carriers (e.g., a list of second carriers). In some embodiments, the carrier transactions logic 242 may also be configured to retrieve a list of producer codes (e.g., a list of second producer codes) for each carrier from that list of carriers. For example, this retrieved list of producer codes by the transmission transactional data logic 242 may be stored within the producer code data 257 of the carrier data 251 and may also be utilized to generate the carrier transaction data 260 of the transactional data 254.

In some embodiments, the data retrieval logic 231 may further include the banking transactions logic 243, which may be configured to initiate a banking data transactions retrieval process from one or more financial institution systems, such as banks, credit unions, etc., at a predetermined time period. For example, similar to the commission and carrier data transactions retrieval processes discussed above, this may include initiating the banking data transactions process on a daily schedule and/or any other desired schedule. In these examples discussed above, the predetermined time period may be the same for all data transactions retrieval processes but may also be different for one or more of the data transactions retrieval processes if desired. Furthermore, the banking transactions logic 243 may be configured to identify one or more financial institutions from the one or more financial institution systems that have bank transactional data(s) available for downloading (or the like) at that predetermined time period—and to then add the identified financial institutions to a list of financial institutions (e.g., a list of banks). In some embodiments, the banking transactions logic 243 may also be configured to retrieve a list of account numbers (e.g., a list of bank account numbers) for each financial institution from that list of financial institutions. For example, this retrieved list of account numbers by the banking transactions logic 243 may be stored within the bank account number data 258 of the financial institution data 253 and may also be utilized to generate the banking data 261 of the transactional data 254.

Accordingly, as described above, the data retrieval logic 231 along with any of the transactional data logics 241-243 may be configured to coordinate the process of anticipating, periodically retrieving, and evaluating (or processing, selecting, gathering, etc.) various data points/types within various transactional data from a list of carriers and/or financial institutions to seek out for reconciling, optimizing, updating, and so on. It should be understood that this coordination may occur in conjunction with any other available logics 232-237 along with any available data 251-261. Also, although only three transactional data logics 241-243 are depicted within the data retrieval logic 231 in FIG. 1, it should be understood that any number of logics may be comprised within the data retrieval logic 231, and any types of transactional data logics (i.e., aside from the commission, transaction, and banking transactions logics 241-243) may be utilized by the data retrieval logic 231, without limitations.

In some embodiments, the validation logic 232 may be utilized to access any particular data that is otherwise not available to the public. For example, the validation logic 232 may be utilized to access CMS data, financial institution system data, and/or the like that may otherwise not be available to the public and/or the transactional data reconciliation device 140. CMSs, financial institution systems, and so on may be deployed with one or more publicly facing interfaces such as a hypertext markup language (HTML) server style webpage or website. As such, certain transactional data available through a CMS website, a financial institution system website, etc., may have limited access to only grant and authenticate the access of users with valid credentials, such as valid usernames, passwords, access tokens, and so on. For example, the users may be any agents/brokers that have the necessary and valid credentials needed to access non-public CMS and/or financial institution system webpages.

This enables implementing the validation logic 232 to automate the process of gaining access and authentication to non-public CMS webpages, financial institution system webpages, and/or any other restricted webpages. For example, this optimized validation process may be used to authenticate a set of credentials for an agent/broker to access and retrieve any transactional data provided by a carrier/financial institution via a non-public CMS/financial institution system webpage by: (i) opening a network browser of an AMS associated with the agent/broker; (ii) automatically entering an address (i.e., a universal resource locator (URL) address) of the non-public CMS/financial institution system webpage into the opened network browser; (iii) entering the set of credentials for the agent/broker in the entered address to gain access (i.e., login) into the non-public CMS/financial institution system webpage; and (iv) therefore authenticating the valid credentials of the agent/broker to gain access to evaluate, select, scrap, convert, process, and/or import the transactional data from the non-public CMS/financial institution system webpage. In some embodiments, the validation logic 232 may not be capable of authenticating the set of entered credentials to gain access to the respective non-public CMS/financial institution system webpage, as such the error generation logic 235 may be configured to generate an error message (e.g., a "Invalid Credentials" error message) that may be transmitted to the respective AMS associated with the respective agent/broker.

In certain embodiments, a user (e.g., an agent, a broker, a processing staff, etc.) may securely store their credentials and the credentials of any other users within the validation logic 232, which may be used to input the necessary credentials when prompted by any non-public webpages. For example, as various processes described herein may include various data points/types related to various transactional data, carriers, financial institution systems, etc., the user may utilize the validation logic 232 to store multiple credentials with the necessary login information, such that the respective user is not prompted numerous times to login during any of these processes, including when any data transactions retrieval processes are scheduled at a high frequency, during off-hours, and so on.

That is, certain carriers and financial institution systems may require the user to input their respective credentials at various rates and frequencies. For example, some carriers may need to verify credentials upon viewing each of the non-public CMS webpages, while other carriers may store credential authorizations within cookie formats that grant access during particular extended time periods. The validation logic 232 may be configured to track and anticipate those validation/authentication rules, which, in certain embodiments, may be utilized by the data retrieval logic 231, the parameter selection logic 233, the data scrapping logic 234, the file conversion logic 236, and/or the data reconciliation logic 237 to better optimize the data transactions retrieval processes, the scraping process, the file conversion process, and/or the data importation process, and to facilitate the error generation process by substantially reducing error messages from being generated by the error generation logic 235.

In most embodiments, the parameter selection logic 233 may be configured to evaluate any type of transactional data and data points from a plurality of transactional data, which are provided by a carrier/financial institution via a CMS/financial institution system webpage. For example, after the agent/broker credentials are authenticated, the parameter selection logic 233 may be configured to automatically navigate to a particular data section (i.e., a processing data section, an importing data section, a downloading data section, etc.) of the respective CMS/financial institution system webpage to gain access to evaluate, select (or cleanse, filter, etc.), and process the transactional data and data points from the respective transactional data. In some embodiments, the parameter selection logic 233 may not be capable of gaining access to the particular data section, as such the error generation logic 235 may be configured to generate an error message (e.g., a "No Access" error message) that may be transmitted to the respective AMS associated with the respective agent/broker.

Whereas, in many other embodiments, the parameter selection logic 233 may gain access to the particular data section to select one or more parameters from the respective transactional data with regards to the desired transactional data and data points. In most embodiments, the parameter selection logic 233 may be configured to then enter the selected parameters into the particular data section to thereby process (or load) a file based on the selected parameters of the respective transactional data (i.e., a transactional data file comprising any desired type of transactional data and data points). In some embodiments, the one or more selected parameters may include a specified data processing/loading instruction (e.g., an HTML table, etc.), a specified file format (e.g., an Excel file format, a PDF file format, etc.), a specified attribute or header (e.g., a total commission/transaction amount, a late-payment information, an available funds amount, etc.), a specified number of data inputs, and so on. The parameter selection logic 233 may utilize the selected/entered parameters to cleanse through all of the transactional data and data points from the respective transactional data, where the cleansed data and data points may not be needed by the respective agent/broker and may thus be used to optimized and personalize that transactional data for processing, scraping, retrieving, and optimizing.

In several embodiments, the parameter selection logic 233 may be further configured to facilitate and direct the scraping process, for example, in conjunction with the data scraping logic 234 discussed below, by generating a more personalized and efficient order of operations. In some embodiments, the parameter selection logic 233 may also be configured to facilitate the data transactions retrieval and validation and processes, for example, in conjunction with the data transactions retrieval and validation logics 231-232.

For example, if a CMS webpage provides various data points that are sought for various transactional data, the parameter selection logic 233 may direct the data transactions retrieval, validation, and data scraping logics 231-233 to load the CMS webpage a single time and to then select, process, and retrieve the various data points prior to loading another CMS page, as compared to loading the same CMS webpage over and over again for each data point sought. Furthermore, in some embodiments, the parameter selection logic 233 may be configured to receive a set of desired data and parameters relating to pools of various data types/points from various transactional data that are requested to be retrieved prior to web scraping. In response to receiving this set of desired data and parameters, the parameter selection logic 233 may provide a retrieving map, a scraping map, an optimizing map, and/or the like, which may direct the respective processes through an efficient and personalized order of operations.

In some embodiments, the data scraping logic 234 may be configured to directly interface and load any type of transactional data and data points from any of the AMSs, CMSs, and/or financial institution systems. For example, the data points may comprise any desired data points capable of being loaded from the various transactional data types, such as commission data, transaction data, banking data, etc., which may include, but are not limited to, commission/transaction due amounts, commission/transaction paid amounts, total number of daily bank deposits, bank remaining balance amounts, and so on. Continuing with this example, after the one or more parameters are selected/entered to load the respective file, the data scrapping logic 234 may be configured to determine whether the loaded file is capable of being scrapped.

In several embodiments, the data scrapping logic 234 may be configured to scrape the file directly from the respective CMS/financial institution system webpage in response to determining that the data points of the transactional data have been loaded in an HTML table format. For example, the data scrapping logic 234 may be capable of scrapping such data points of the transactional data in the loaded HTML table format directly off the respective webpage, where the scrapped data may be ultimately used to generate one or more transactional data files, such as commission, transaction, and/or bank transactional data files, and import (or transmit) the generated transactional data files to be stored in one or more data types within the data store 250. In this example discussed above, the data scrapping logic 234 may be configured to coordinate with the data reconciliation logic 237 to (i) scrape the desired data points of the transactional data from the loaded HTML table format on the respective webpage, (ii) apply one or more business rules to the scraped transactional data and data points that is specific to the respective carrier/financial institution, and (iii) generate the respective transactional data file based on the applied business rules, which may be respectively stored in at least one or more of the commission, transaction, and banking data 259-261 of the transactional data 254 and the scrapped data 255 within the data store 250.

As discussed above, in several embodiments, the data scraping logic 234 may be configured to automatically scan CMS/financial institution system webpages at predetermined time periods (e.g., on a daily schedule) to identify data points from various transactional data types and to then import the identified transactional data types and data points to store the imported transactional data in any of the respective data types 251-261 within the data store 250. This optimized data transactions retrieval and importation process(es) may then be used, for example, to reconcile: the actual commissions received from the respective carriers of the CMSs to those commissions deposited in the respective banks of the financial institutions systems; the actual commissions received to those expected commissions set forth by the agreement contracts implemented by the respective carriers of the CMSs; the download information received from the respective carriers of the CMSs against the list of carrier transactional data in the respective systems of records of the CMSs; and the bank transactional data deposits against the commission amounts on the commission transactional data received from the respective carriers of the CMSs.

In some embodiments, scraping may be accomplished through HTML and/or cascading style sheet (CSS) tag identification processes. In other embodiments, scraping may be implemented with any other known processes. In additional embodiments, the location of data to scrape may be determined from one or more templates and/or other preconfigured processes that are preconfigured for each specific webpage. In certain embodiments, the data scraping logic 234 may compare the transactional data to be scraped against one or more of the currently stored data types 251-261 to verify the scraping process is operating correctly before continuing. For example, when scraping for a particular calendar date, the data scraping logic 234 may initially attempt to verify that the target data to scrape is in the format of a calendar date, and may thereafter attempt to implement a comparison to verify any difference in such data prior to optimizing the scrapped data in the available data types 251-261 stored within the data store 250. It should be understood that any transactional data types and any related data points may be retrieved, scrapped, loaded, processed, and/or imported by any of the available logics 231-237, 241-243 within the memory 230, and may be stored in one or more of any of the available data types 251-261 within the data store 250, without limitations.

In some embodiments, the error generation logic 235 may be utilized to generate and transmit messages, notifications, and/or the like that one or more errors have occurred during any processes described herein. For example, errors may be generated and transmitted in various ways including, but not limited to, invalid credential error messages, no access error messages, desired data not found error messages, invalid data format error messages, invalid file input/output type error messages, unhandled error messages, and so on. Errors may be in the form of screen prompts, emails, text/SMS messages, and/or the like. As such, the response of the transactional data reconciliation device 140 to one or more generated error messages may be preconfigured and/or personalized based on the particular processes, data sought, users, and so on. For example, responses to any of the generated error messages may include, but are not limited to, continuing, stopping, delaying, and/or requiring acknowledgment prior to continuing with the respective processes. It should be understood that any error generation logic, such as the error generation logic 235, may be configured with a catch all error message generation associated with any unidentified error messages, unknown error messages, and/or unexpected error messages, without limitation.

In most embodiments, the file conversion logic 236 may be configured to process any transactional data files retrieved from any CMSs, financial institution systems, etc., and to convert any processed transactional data files if needed based on the respective file input formats of the processed transactional data files. For example, in response to determining that the transactional data file is not capable of being scrapped, the file conversion logic 236 may be configured to process the transactional data file based on the selected/entered parameters (i.e., download the transactional data file from the respective CMS/financial institution system). Thereafter, in this example, the file conversion logic 236 may be configured to also convert the processed transactional data file to a spreadsheet file input format, such as an Excel file input format, if/when the processed transactional data file is in a portable file input format such as a PDF file input format. Finally, in some embodiments, the file conversion logic 236 may not be capable of converting the processed transactional data file to a valid file input format such as the Excel file input format, the PDF file input format, and/or any other similar spreadsheet/portable file input format, as such the error generation logic 235 may be configured to generate an error message (e.g., a "Invalid File" error message) that may be transmitted to the respective AMS associated with the respective agent/broker.

Finally, in most embodiments, the data reconciliation logic 237 may be configured to facilitate the optimized retrieval and importation described herein and to generate transactional data 254, scrapped data 255, and any other desired data to upload, store, and reconcile such data within the available data types 251-261 of the data store 250 based on any processed transactional data files, scrapped transactional data points, and so on that have been retrieved from any CMSs, AMSs, and financial institution systems. For example, according to most embodiments, the data reconciliation logic 237 may be configured to make any necessary file adjustments (as needed/desired) to the processed transactional data file, which may have been converted from the PDF file input format to the Excel file input format. Furthermore, in most embodiments, the data reconciliation logic 237 may be configured to apply one or more carrier/bank specific business rules to the processed transactional data file prior to generating any transactional data files based on the applied carrier/specific business rules. This proactive measure of incorporating the applied carrier/bank specific business rules to the optimized retrieval and importation processes described herein may help to ensure a higher degree of data quality, which thereby creates better and more accurate reporting of key business metrics for the respective AMSs, and also translates to better client/customer experiences for the clients/customers associated with the respective AMSs. For example, the business rules may be associated with, but are not limited to, payment information, client/customer preferences, contact information, credit/bank ratings, and so on.

It should be noted that the optimized retrieval and importation processes depicted in FIG. 2 may generate various data types to store within the data store 250, such as carrier data 251, agency data 251, financial institution data 253, transactional data 254, scraped data 255 and so on. Accordingly, in most embodiments, the data reconciliation logic 237 may be configured to process, convert, adjust, and/or upload one form of data types, such as the carrier data 251, the financial institution system data 253, the scraped data 255, and so on, into another form of available data types (i.e., adjusted data) such as the producer code data 257, the bank account number data 258, the transactional data 254, the business rule data 256, and so on. In additional embodiments, the data reconciliation logic 237 may then generate, transmit, and/or provide the adjusted data to one or more agents/brokers, devices, and/or the like, which are associated with the respective system(s) such as the AMSs, CMS, and/or financial institution systems. The processing and adjusting of such data may be typically needed as each AMS, CMS, and/or financial institution systems may be configured with a unique or otherwise proprietary data intake/outtake processes.

For example, various CMSs and financial institution systems may provide batch data in the form of various types of transactional data files to the transactional data reconciliation device 140, while various AMSs may be configured to receive batch data also in the form of various types of transactional data files from the transactional data reconciliation device 140. To accommodate for this example, the transactional data reconciliation device 140 may implement one or more logics within the memory 230, such as the parameter selection logic 233, data scrapping logic 234, file conversion 236, and/or data reconciliation logic 237, to facilitate the conversion and any necessary adjustments of any raw scraped/processed transactional data to any available data type within the data store 250, which may conform to the various types of provided/received transactional data files, and may transmit to any suitable recipients such as any insurance brokers of the various AMSs. However, in certain embodiments where any AMSs, CMSs, and financial institution system may not have direct batch input/output processes, it should be understood that any variety of data formats exist, such that any available data types 251-261 within the data store 250 may be processed, converted, and adjusted to any other particular data formats, which allow for the batch input/output processes via any separate programs, optimization tools, and known converting processes, without limitations.

Likewise, in regard to the data store 250 depicted in FIG. 2 in the transactional data reconciliation device 140, it should be noted that further discussion of the transactional data types and data points that may be stored within the data store 250 are discussed in greater detail below. In many embodiments, the data store 250 may be configured as a physical storage device within the transactional data reconciliation device 140. In additional embodiments, the data store 250 may be a separate or external device physically connected to the transactional data reconciliation device 140. In further additional embodiments, the data store 250 may be situated in a remote client, such as a cloud-based server or the like, and provides data read/write access in response to the transactional data reconciliation device 140. It should be understood that any data file input formats, data types, and data points available within the data store 250 may be utilized in any desired configurations and may thus vary greatly and be configured as needed, which includes combining, omitting, and/or adding one or more data structures, without limitations.

In various embodiments, the carrier data 251 may include data related to any number of insurance carriers associated with any CMSs that interface with any number of insurance agencies/brokerages associated with any AMSs. For example, the carrier data 251 may store any carrier related data points which may be used to facilitate any of the optimized retrieval and importation processes described herein, such as the retrieval processes for carrier lists and producer codes, the validation process, the evaluation process, and so on. The carrier related data points may include, but are not limited to, CMS types, CMS location/web addresses, carrier credentials, selected parameters, preconfigured scraping templates, publicly/non-publicly retrieved data points, preconfigured file adjustments, specified business rules, preconfigured links to associated data concerning any other available data types in the data store 250, and so on. In addition to the non-limiting example, the carrier data 251 may be implemented to particularly store data specific to the producer code data 257, which may include any number of unique identifier numbers assigned to each user/entity associated with each insurance carrier. Although only one producer code data 257 is depicted within the carrier data 251 in FIG. 2, it should be understood that any number of producer code data 257 and any other types of carrier related data may be stored within the carrier data 251, without limitations. Also, it should be understood that the producer code data 257 and the carrier data 251 may be stored as separate data types and structures within the data store 250 and/or as a single multi-dimensional data structure within the data store 250, without limitations.

In most embodiments, the agency data 252 may include data related to any number of insurance agencies/brokerages associated with any AMSs that may be configured to utilize the transactional data reconciliation device 140. For example, the transactional data reconciliation device 140 may be operated by a third party (i.e., not owned by the insurance agencies/brokerages), such that the data of each insurance agency/brokerage that utilizes the transactional data reconciliation device 140 may be stored within the agency data 252. In other embodiments, an insurance agent/broker may operate under multiple business entities, names, and/or jurisdictions, which may require specialized rules to comply with various laws, regulations, and so on. In such embodiments, the agency data 252 may be utilized to anticipate and update any processes of operations related to that insurance agent/broker, for example, by identifying the particular legal business entity that is currently operating the transactional data reconciliation device 140, by identifying the particular business jurisdiction and/or physical location in which the transactional data reconciliation device 140 is currently being operated from, and so on. Furthermore, the agency data 252 may be used to more precisely indicate what transactional data related data types and data points may be key to that agency's business processes and operations, such that any optimized retrieval and importation processes related to that agency may be capable of focusing precisely on those indicated data types/points.

In several embodiments, the financial institution data 253 may include data related to any number of financial institutions such as any types of banks and/or the like, which may be associated with any financial institution systems, any insurance agencies/brokerages of any AMSs, and any carriers of any CMSs. For example, the financial institution data 253 may store any bank related data points which may be used to facilitate any of the optimized retrieval and importation processes described herein, such as the retrieval processes for bank lists and account numbers, the validation process, the evaluation process, and so on. The bank related data points may include, but are not limited to, bank types, bank location/web addresses, user credentials, selected parameters, preconfigured scraping templates, publicly/non-publicly retrieved data points such as transaction dates, transaction information, remaining balances, transaction amounts, transaction information, etc., preconfigured file adjustments, specified business rules, preconfigured links to associated data concerning any other available data types in the data store 250, and so on.

In addition to the non-limiting example, the financial institution data 253 may be implemented to particularly store data specific to the bank account number data 258, which may include any number of related bank account numbers assigned to each agency, brokerage, carrier, and/or financial institution associated with each financial institution system. Although only one bank account number data 258 is depicted within the financial institution data 253 in FIG. 2, it should be understood that any number of bank account number data 258 and any other types of bank related data may be stored within the financial institution data 253, without limitations. Also, it should be understood that the bank account number data 258 and the financial institution data 253 may be stored as separate data types and structures within the data store 250 and/or as a single multi-dimensional data structure within the data store 250, without limitations.

In most embodiments, the transactional data 254 may include data related to any types of transactional data associated with any CMSs and financial institution systems that interface with any insurance agencies and brokerages associated with any AMSs. For example, the transactional data 254 may store any transactional data related data points from any transactional data files that are ultimately generated by various operations of the optimized retrieval and importation processes described herein. The transactional data files may include, but are not limited to, commission transactional data files, carrier transactional data files, bank transactional data files, any combination thereof, and/or any other desired transactional data related files. The transactional data related data points may include, but are not limited to, file types, location/web addresses, credentials, selected parameters, preconfigured scraping templates, publicly/non-publicly retrieved data points, preconfigured file adjustments, specified business rules, preconfigured links to associated data concerning any other available data types in the data store 250, and so on.

In addition to the non-limiting example, the transactional data 254 may be implemented to particularly store data specific to the commission data 259, the carrier transaction data 260, and the banking data 261. These particular transactional data types 259-261 may include data related to any of the respective transactional data files that have been retrieved from any of the respective carriers/banks of the CMSs/financial institution systems. As described above, the respective carriers/banks may be identified by a predetermined time period schedule (e.g., a daily schedule) that checks for carriers/banks that need commission, transaction, and/or bank transactional data loaded on that particular scheduled time period. The retrieved data from the respective transactional data files may be used for a variety of operational, financial, customer service related, and/or reporting processes and operations by any respective agencies/brokerages of the AMSs, where such processes and operations may include providing better customer experiences, improving customer retention, creating better quality and more accurate data reporting on key business metrics, and so on.

For example, an agent/broker may have numerous clients with multiple transactional data between them. Each transactional data may be associated with one or more unique transactional data types 259-261 and may include transactional data related data points that are respectively stored in the one or more unique transactional data types 259-261 within the transactional data 254. It should be understood that any of the commission, transaction, and banking data 259-261 may include any number of separate transactional data files having any number of data points and any types of data points, where each of the unique transactional data types 259-261 may be associated with at least one single transactional data file having one or more individual/atomic pieces of data points, without limitation. Also, although three transactional data types 259-261 are depicted within the transactional data 254 in FIG. 2, it should be understood that any number of transactional data types 259-261 and any other types of transactional data related data may be stored within the transactional data 254, without limitations. It should also be understood that the transactional data types 259-261 and the transactional data 254 may be stored as separate data types and structures within the data store 250 and/or as a single multi-dimensional data structure within the data store 250, without limitations.

Transactional data points may be associated with, for example, each transactional data type that may have discrete pieces of data, elements, and/or information particularly associated with that transactional data type. Furthermore, many discrete pieces of data may be duplicated or repeated over many different accounts. For example, the transactional data points of each transactional data type may likely be associated with a client, a transactional data identification number or other identification data, a producer code or account number, a current status, a commission, transaction, or banking amount, a total paid amount, a total remaining balance amount, a total due amount, a billing address, a billing method, a particular payment information, a billing history, and so on. Furthermore, in certain embodiments, some or all transactional data points of the transactional data 259-261 within the transactional data 254 may not be present within the transactional data reconciliation device 140. Those particular embodiments may be more suitable for security-conscious applications, where the processing, for example, is implemented on an external server, a personal computer, and/or a mobile computing device susceptible to theft and any other security related issues.

In various embodiments, the scraped data 255 may simply include any of the raw data retrieved from any CMSs, financial institution systems, AMSs, etc., by the transactional data reconciliation device 140. For example, the scrapped data 255 may include the raw data evaluated, selected, processed, and retrieved by the one or more logics 231-237, 241-243 within the memory 230, such as the data retrieval logic 231, the validation logic 232, the data scrapping logic 234, and so on. In some embodiments, the scraped data 255 may include the raw data stored in various formats that may be processed, converted, adjusted, and/or utilized by any of the available logics 231-237, 241-243 within the memory 230 and any of the available data types 251-261 within the data store 250. In other embodiments, the scraped data 255 may simply be a collection of data reads and/or otherwise raw data, which may be initially evaluated, scrapped, and/or retrieved by any of the available logics 231-237, 241-243 within the memory 230, such as the data retrieval logic 231, validation logic 232, parameter selection logic 233, and/or data scrapping logic 234, prior to being further processed, converted, adjusted, imported, and/or reconciled into any of the respective available data types 251-261 within the data store 250.

In many embodiments, the business rule data 256 may include data related to any number of business rules specific to any of the respective carriers, banks, and agencies/brokerages. For example, the business rule data 256 may store any carrier/bank related data points which may be used to facilitate any of the optimized retrieval and importation processes described herein, such as the scraping process, the file converting process, the file adjustment process, the transactional data file generating process, the optimizing process, and so on. The carrier/bank related data points may include, but are not limited to, CMS types, financial institution types, customer related payment information, customer preferences, customer contact information carrier/bank preferences, carrier/bank auditing processes, carrier/bank operational and/or financial related processes, credit/bank ratings, and so on. Finally, it should be understood that any logics 231-237, 241-243 and any data types 251-261 may be configured and utilized by the transactional data reconciliation device 140 for any desired purposes, applications, and processes, without limitations.

Figure 3:
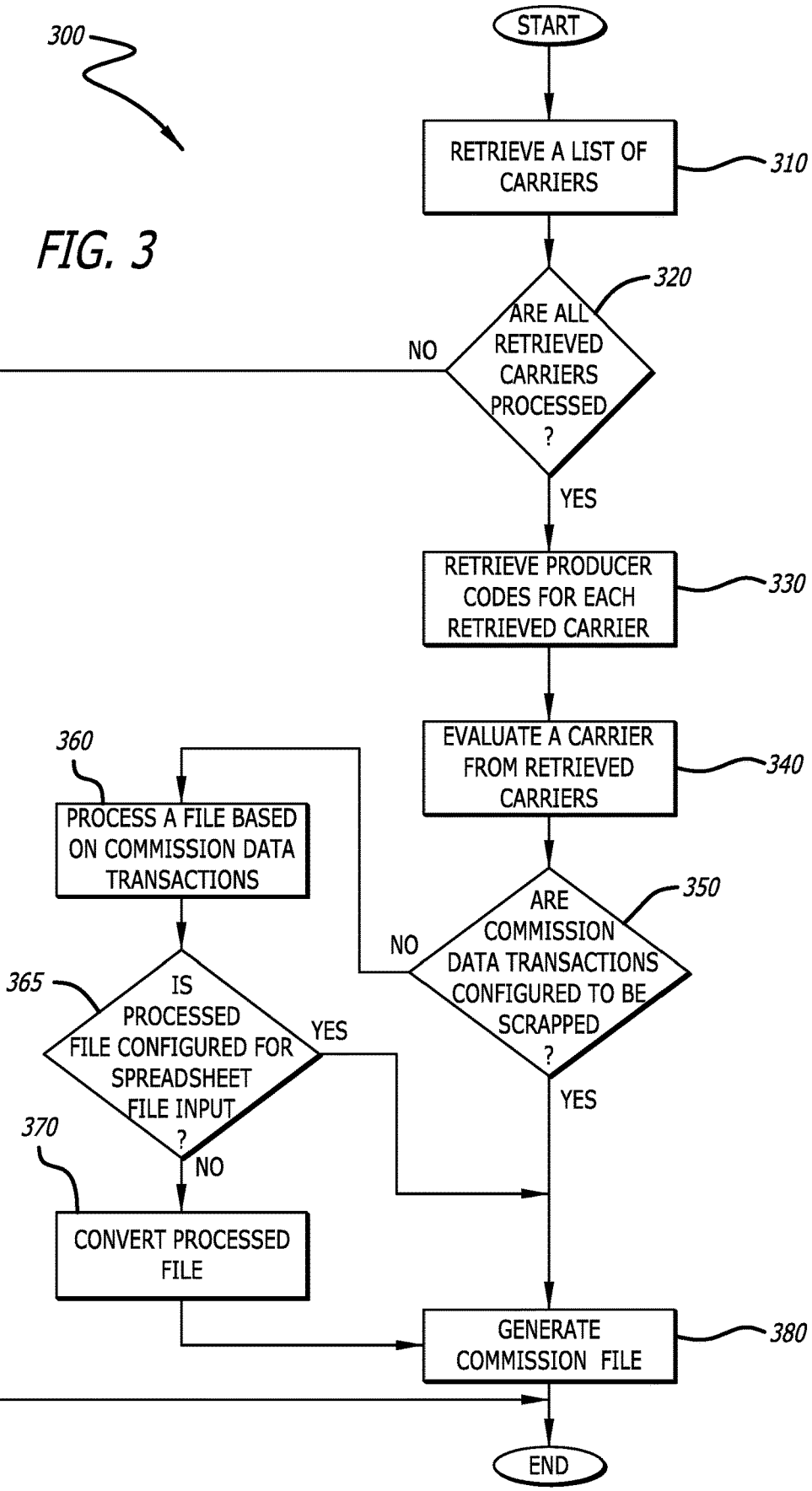
FIG. 3 is a flowchart depicting a carrier commission transactions reconciliation process, in accordance with an embodiment of the present disclosure.

Referring now to FIG. 3, a flowchart depicting a carrier commission transactional data reconciliation process 300 is shown, in accordance with an embodiment of the present disclosure. The process 300 in FIG. 3 depicts embodiments of one or more process flows described herein. For example, the process 300 may be implemented for insurance systems (or the like) to perform one or more optimized retrieval and importation operations and any other data transactions retrieval and optimizing related operations. Furthermore, the process 300 may be implemented by a transactional data reconciliation device which may be configured to facilitate the various optimized retrieval and importation processes and operations described herein. For example, the process 300 may be configured to retrieve any commission-related data transactions from one or more carriers associated with one or more CMSs, and to then generate commission files (or commission transactional data files) based on the retrieved data from the one or more respective carriers of the one or more respective CMSs. In most embodiments, the transactional data reconciliation device may be substantially similar to the transactional data reconciliation device 140 depicted in FIGS. 1-2.

To start, the process 300 may retrieve a list of carriers associated with one or more CMSs, where the list of carriers may be a retrieved list having a first carrier to any desired number carrier (i.e., a $n^{th}$ carrier). In many embodiments, the process 300 of retrieving carrier commission data transactions and generating commission files (or commission transactional data files) may be initiated when the list of carriers is received by the transactional data reconciliation device at a scheduled predetermined time period. For example, as described above, the list of carriers may be implemented as a search list for one or more carriers that have been identified as needing commission transactional data loaded on that scheduled day, where the identified carriers from the search list are then added to the list of carriers. Furthermore, the transactional data reconciliation device may be optimized to self-generate the list of carriers through one or more processes including one or more machine learning/AI based processes.

At block 320, once the list of carriers is known, the process 300 may be initiated to retrieve and process commission data from each carrier in the retrieved list (i.e., each retrieved carrier), such that the process 300 may be configured to then determine whether all carriers from the retrieved list have been processed. For example, the process 300 may proceed to end in response to determining that all retrieved carriers have been processed for their available commission data (i.e., if zero carriers are left in the retrieved list, the process 300 may end all operations). However, in response to determining that not all retrieved carriers have been processed, the process 300 may proceed to block 330 to retrieve one or more producer codes associated with each carrier in the retrieved list. For example, a list of producer codes may be retrieved for each carrier from producer code data within carrier data stored in the transactional data reconciliation device.

At block 340, the process 300 may evaluate a first carrier from the retrieved carriers. For example, as described in greater detail below, the process 300 may be configured to evaluate a workflow specific to one or more CMSs associated with that first carrier. The carrier specific workflow may be configured as a list of general policies (e.g., a map) that directs the evaluating, scraping, and retrieving of data to occur in an organized and more efficient manner. For example, the process 300 may be automatically directed to load one or more webpages associated with the CMS of the first carrier, to validate credentials used to gain access to the CMS's webpages, and to navigate through the webpages and gain access to a download section for retrieving the desired commission data transactions. Each webpage may be loaded through known browser resources such as utilizing a URL address and/or the like. The process 300 may be configured to automatically validate a set of credentials used to login to the respective webpages and gain access to many transactional data types and data points from the download section in one of the respective webpages. Once the first carrier has been evaluated, the process 300 may proceed to block 350 to determine whether the desired commission data transactions in the download section are configured to be scrapped. For example, a determination may be made to identify whether the desired commission data transactions were loaded in an HTML table format on the respective webpage. In this example, once the commission data transactions have been loaded, one or more desired commission data points may be processed if that data was loaded in the HTML table format on that webpage. In many embodiments, the processing of these data points may be simply to scrape the respective formatted data directly from the webpage.

In response to determining that the desired commission data is not configured to be scrapped, the process 300 may proceed to block 360 to process a commission transactional data file based on the desired commission data transactions. At block 365, the process 300 may determine whether the processed commission transactional data file is configured in the form of a spreadsheet file input format, such as an Excel file input format and/or any other similar spreadsheet file input format. In response to determining that the processed commission transactional data file is not configured in the spreadsheet file input format, the process 300 may proceed to block 370 to convert the processed commission transactional data file to a spreadsheet file input format. For example, if a processed transactional data file is configured in a portable file input format such as a PDF file input format and/or any other similar portable file input format, a file conversion logic of the transactional data reconciliation device may be configured to convert the processed transactional data file to the spreadsheet file input format.

Referring back to block 350, in response to determining that the desired commission data transactions are configured to be scrapped, the process 300 may proceed to block 380. Similarly, in response to determining that the processed commission transactional data file is configured in the spreadsheet file input format at block 365, and/or once the processed commission transactional data file has been converted at block 370, the process 300 may also proceed to block 380. Accordingly, at block 380, the process 300 may be configured to generate a commission file (i.e., a carrier commission transactional data file) based on at least one or more of the scrapped data, converted commission transactional file input data, and/or any other related importation operations such as adjusting one or more file input data points, applying one or more carrier specific business rules, and so on.

In additional embodiments, the transactional data reconciliation device may be configured to further process the generated commission files for output to one or more AMSs, once all commission files have been generated for all producer codes provided by all retrieved carriers. That is, if other carriers from the retrieved list remain to be processed, the process 300 depicted in FIG. 3 may be configured to return back and again load and process a next carrier, once all commission files have been generated for that carrier (e.g., for that first carrier). When all retrieved carriers have been processed and all commission files have been ultimately generated for all respective producer codes, any particularly desired commission files may be transmitted to any respective AMSs. Thereafter, if all desired commission files have been respectively transmitted, the process may proceed to end all operations.

Figure 4:
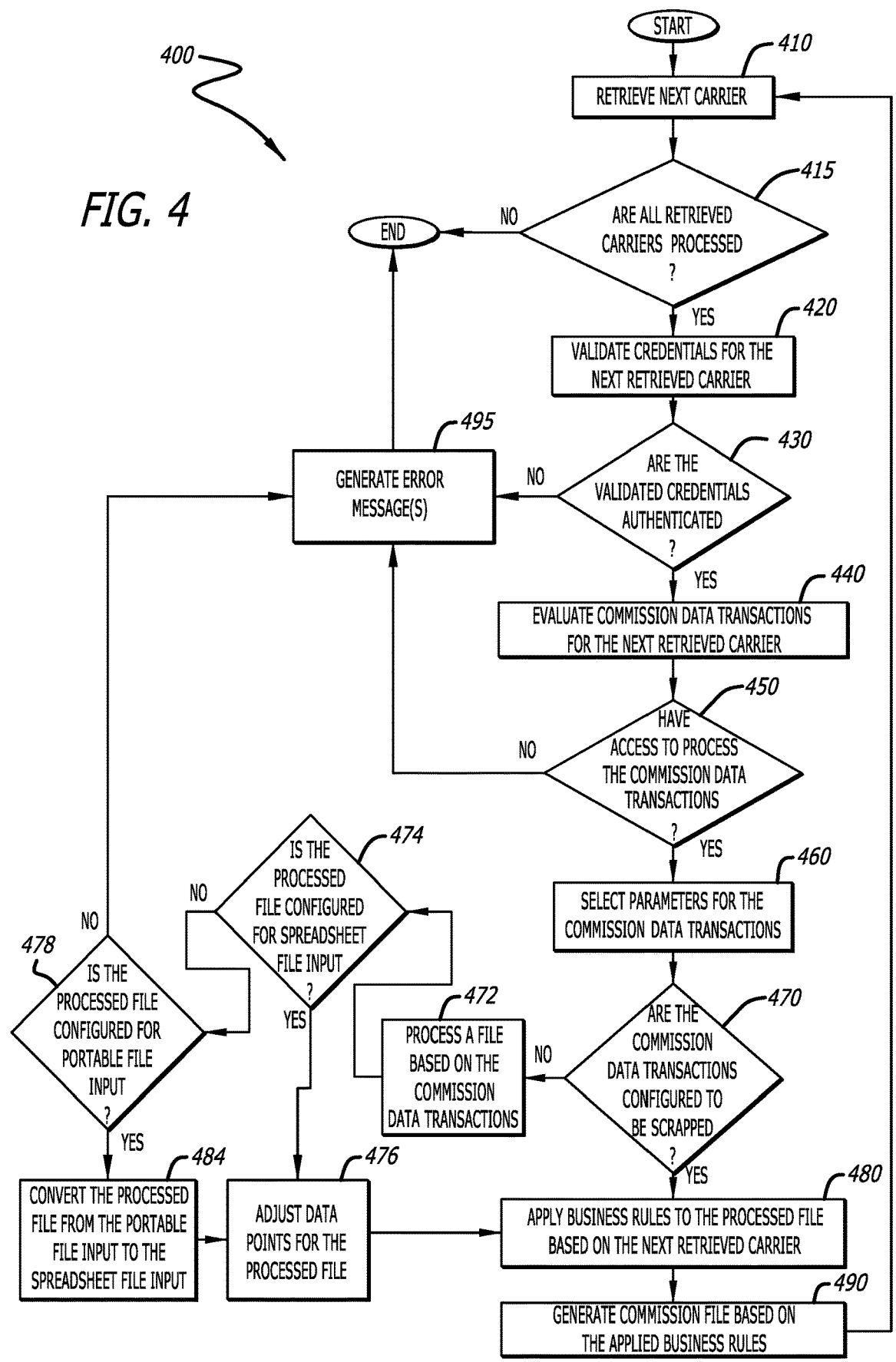
FIG. 4 is a detailed flowchart depicting a process for retrieving commission data transactions from a plurality of carriers to optimize and reconcile commission transactional data, in accordance with an embodiment of the present disclosure.

Referring now to FIG. 4, a detailed flowchart depicting a process 400 for retrieving and optimizing commission data transactions is shown, in accordance with an embodiment of the present disclosure. The process 400 in FIG. 4 depicts in greater detail embodiments of one or more process flows related to the process 300 depicted above in FIG. 3. For example, the process 400 may be implemented for insurance systems such as an insurance agency/broker associated with an AMS that desires to perform any optimized retrieval and importation operations described herein to reconcile any commission-related data transactions from one or more carriers of one or more CMSs. Furthermore, the process 400 may be implemented by a transactional data reconciliation device configured to facilitate any of the optimized retrieval and importation processes and operations described herein, which may particularly include, for example, retrieving carrier lists with their respective producer codes, validating the given credentials to gain access to any desired any commission-related data transactions and related data from the respective CMSs' webpages, and generating the desired commission files based on applied carrier specific business rules, adjusted file data points, converted file input formats, and scrapped commission data. In most embodiments, the transactional data reconciliation device may be substantially similar to the transactional data reconciliation device 140 depicted in FIGS. 1-2.

At block 410, the process 400 may start and may retrieve a first (next) carrier from a list of carriers similar to the retrieved list of carriers depicted at block 310 in FIG. 3. For example, as described above, the process 400 may retrieve the next carrier and any producer codes associated with that next carrier. At block 415, the process 400 may determine whether all the retrieved carriers from the retrieved list have been processed. For example, the process 400 may proceed to end in response to determining that all retrieved carriers have been processed for their available commission data. However, in response to determining that the process 400 has retrieved the next carrier and that not all retrieved carriers have been processed, the process 400 may proceed to block 420 to validate one or more credentials for the next retrieved carrier.

For example, once the next carrier and respective producer codes are retrieved, the process 400 may attempt to login to one or more webpages associated with the CMS of the next carrier by entering credentials to gain access to the CMS's webpages. It should be noted that this step is often required to gain access to most transactional data and data points in most CMSs, but this step is not always required by all CMSs. At block 430, once the credentials have been entered, the process 400 may determine whether the entered credentials have been authenticated. In most embodiments, in response to determining that the credentials are not authenticated, the process 400 may proceed to block 495 and may generate an error message based on the entered credentials, such as generating and transmitting an "Invalid Credentials" error message to the respective AMS associated with the transactional data reconciliation device.

Likewise, in response to determining that the credentials have been authenticated, the process 400 may proceed to block 440 and may evaluate/process any desired commission data transactions to the next carrier. In some embodiments, the evaluation of the carrier commission data may be similar to the one or more evaluation steps depicted at block 340 in FIG. 3. For example, the process 400 may be configured to automatically navigate through the CMS's webpages to a download section on one of the CMS's webpages, which may be used to process and load the desired commission data transactions specific to the next carrier. At block 450, the process 400 may determine whether the transactional data reconciliation device has access to process the next carrier's commission data transactions. For example, the process 400 may determine whether the transactional data reconciliation device has access to process the desired commission data transactions from the particular download section of the CMS's webpages.

In some embodiments, in response to determining that the particular download section may not be accessed, the process 400 may proceed to block 495 and may generate an error message based on the accessibility to the particular download section, such as generating and transmitting a "No Access" error message to the respective AMS associated with the transactional data reconciliation device. Likewise, in response to determining that the particular download section may be accessed, the process 400 may proceed to block 460 and may select one or more parameters to load the desired commission data transactions of the next carrier. At block 470, once the parameters for loading the desired commission data transactions have been selected, the process 400 may determine whether the desired commission data transactions have been configured to be scrapped.

For example, a determination may be made to identify whether the desired commission data transactions was loaded in an HTML table format on the respective CMS's webpage. In this example, one or more desired commission data points (or commission data transactions data points) for the next carrier may be processed if that data was loaded in the HTML table format on that CMS's webpage. In response to determining that the desired commission data is configured to be scrapped, the process 400 may proceed to block 480. However, in response to determining that the desired commission data is not configured to be scrapped, the process 400 may proceed to block 472 to process a commission transactional data file based on the desired commission data transactions. That is, once the determination is made that the data may not be directly scrapped, the process 400 may load the desired commission data transactions as a file from the download section in the CMS's webpage.

At block 474, the process 400 may determine whether the processed commission transactional data file is configured in a spreadsheet file input format (e.g., an Excel format). In response to determining that the processed commission transactional data file is not configured in the spreadsheet file input format, the process 400 may proceed to block 478 to determine whether the processed commission transactional data file is configured in a portable file input format (e.g., a PDF format). Furthermore, once the determination has been made that the processed commission transactional data file is configured in the portable file input format, the process 400 may proceed to block 484 to convert the processed commission transactional data file. For example, the process 400 may be configured to convert the next carrier's processed commission transactional data file from the portable file input format to the spreadsheet file input format. Meanwhile, in response to determining that the processed commission transactional data file is not configured in the portable file input format back at block 474, the process 400 may proceed to block 495 to generate an error message based on the invalid format of that processed file, such as generating and transmitting an "Invalid File" error message to the respective AMS associated with the transactional data reconciliation device.

At block 476, in response to determining that the processed commission transactional data file is configured in the spreadsheet file input format, or similarly once that processed file was converted to the spreadsheet file input format, the process 400 may be configured to implement one or more desired file adjustments to the processed file. For example, the process 400 may adjust one or more data file inputs in the processed file, which may include adjusting the format of the data points loaded in the spreadsheet file input format. At block 480, in response to determining that the desired commission data may be scrapped back at block 470, or similarly once the commission transactional data file was adjusted, the process 400 may apply one or more business rules to the processed commission transactional data file, where the applied business rules may be configured as carrier specific business rules particularly related to the next carrier. Finally, at block 490, the process 400 may generate a commission file (or a commission transactional data file) for the next carrier based on the applied business rules and the processed commission data transactions.

In some embodiments, once the commission file for the next carrier has been generated at block 490, the process 400 may return back to block 410 to retrieve a second (next) carrier from the list of carriers and again process that next carrier and so on. As such, once all carrier commission files have been ultimately generated for all producer codes for all retrieved carriers, the process 400 may determine that all retrieved carriers from the list of carriers have been processed at block 415 and may then proceed to end. Similarly, in some embodiments, the process 400 may end once the respective error message has been generated at block 495. In addition, it should be understood that any generated commission files may be further processed for output and then transmitted to any of the respective AMSs, without limitation.

Figure 5:
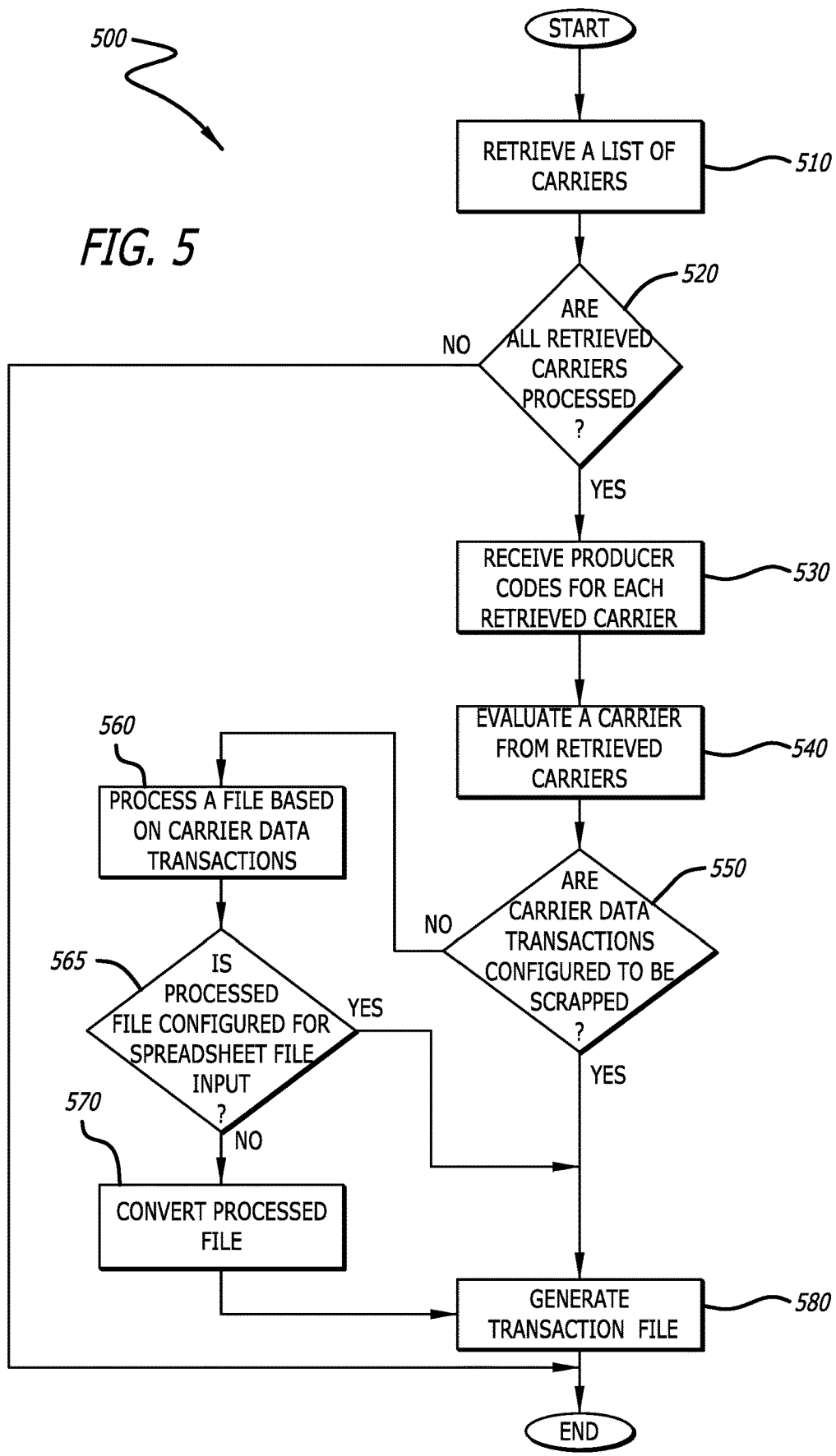
FIG. 5 is a flowchart depicting a carrier transactions reconciliation process, in accordance with an embodiment of the present disclosure.

Referring now to FIG. 5, a flowchart depicting a carrier transactions reconciliation process 500 is shown, in accordance with an embodiment of the present disclosure. The process 500 in FIG. 5 depicts embodiments of one or more process flows described herein. For example, the process 500 may be implemented for insurance systems to perform one or more optimized retrieval and importation operations and any other data transactions retrieval and optimizing related operations. Furthermore, the process 500 may be implemented by a transactional data reconciliation device which may be configured to facilitate the various optimized retrieval and importation processes and operations described herein. For example, the process 500 may be configured to retrieve commission any carrier-related data transactions from one or more carriers associated with one or more CMSs, and to then generate transaction files (or carrier transaction transactional data files) based on the retrieved data from the one or more respective carriers of the one or more respective CMSs. In most embodiments, the transactional data reconciliation device may be substantially similar to the transactional data reconciliation device 140 depicted in FIGS. 1-2.

To start, the process 500 may retrieve a list of carriers associated with one or more CMSs, where the list of carriers may be a retrieved list having a first carrier to any desired number carrier (i.e., a $n^{th}$ carrier). In many embodiments, the process 500 of retrieving carrier data transactions and generating carrier files may be initiated when the list of carriers is received by the transactional data reconciliation device at a scheduled predetermined time period. For example, as described above, the list of carriers may be implemented as a search list for one or more carriers that have been identified as needing carrier data transactions loaded on that scheduled day, where the identified carriers from the search list are then added to the list of carriers. Furthermore, the transactional data reconciliation device may be optimized to self-generate the list of carriers through one or more processes including one or more machine learning/AI based processes.

At block 520, once the list of carriers is known, the process 500 may be initiated to retrieve and process carrier data transactions from each carrier in the retrieved list (i.e., each retrieved carrier), such that the process 500 may be configured to then determine whether all carriers from the retrieved list have been processed. For example, the process 500 may proceed to end in response to determining that all retrieved carriers have been processed for their available carrier data transactions (i.e., if zero carriers are left in the retrieved list, the process 500 may end all operations). However, in response to determining that not all retrieved carriers have been processed, the process 500 may proceed to block 530 to retrieve one or more producer codes associated with each carrier in the retrieved list. For example, a list of producer codes may be retrieved for each carrier from producer code data within carrier data stored in the transactional data reconciliation device.

At block 540, the process 500 may evaluate a first carrier from the retrieved carriers. For example, the process 500 may be configured to evaluate a workflow specific to one or more CMSs associated with that first carrier. The carrier specific workflow may be configured as a list of general policies that directs the evaluating, scraping, and retrieving of data to occur in an organized and more efficient manner. For example, the process 500 may be automatically directed to load one or more webpages associated with the CMS of the first carrier, to validate credentials used to gain access to the CMS's webpages, and to navigate through the webpages and gain access to a download section for retrieving the desired carrier transaction data. Each webpage may be loaded through known browser resources such as utilizing a URL address and/or the like. The process 500 may be configured to automatically validate a set of credentials used to login to the respective webpages and gain access to many transactional data types and data points from the download section in one of the respective webpages. Once the first carrier has been evaluated, the process 500 may proceed to block 550 to determine whether the desired carrier data transactions in the download section is configured to be scrapped. For example, a determination may be made to identify whether the desired carrier data transactions were loaded in an HTML table format on the respective webpage. In this example, once the carrier data transactions have been loaded, one or more desired carrier data points may be processed if that data was loaded in the HTML table format on that webpage. In many embodiments, the processing of these data points may be simply to scrape the respective formatted data directly from the webpage.

In response to determining that the desired carrier data transactions are not configured to be scrapped, the process 500 may proceed to block 560 to process a carrier transactional data file based on the desired carrier data transactions. At block 565, the process 500 may determine whether the processed carrier transactional data file is configured in the form of a spreadsheet file input format, such as an Excel file input format and/or any other similar spreadsheet file input format. In response to determining that the processed carrier transactional data file is not configured in the spreadsheet file input format, the process 500 may proceed to block 570 to convert the processed carrier transactional data file to a spreadsheet file input format. For example, if a processed transactional data file is configured in a portable file input format such as a PDF file input format and/or any other similar portable file input format, a file conversion logic of the transactional data reconciliation device may be configured to convert the processed transactional data file to the spreadsheet file input format.

Referring back to block 550, in response to determining that the desired carrier data transactions are configured to be scrapped, the process 500 may proceed to block 580. Similarly, in response to determining that the processed carrier transactional data file is configured in the spreadsheet file input format at block 565, and/or once the processed carrier transactional data file has been converted at block 570, the process 500 may also proceed to block 580. Accordingly, at block 580, the process 500 may be configured to generate a transaction file (i.e., a carrier transaction transactional data file) based on at least one or more of the scrapped data, converted carrier transactional file input data, and/or any other related importation operations such as adjusting one or more file input data points, applying one or more carrier specific business rules, and so on.

In additional embodiments, the transactional data reconciliation device may be configured to further process the generated transaction files for output to one or more AMSs, once all transaction files have been generated for all producer codes provided by all retrieved carriers. That is, if other carriers from the retrieved list remain to be processed, the process 300 depicted in FIG. 3 may be configured to return back and again load and process a next carrier, once all transaction files have been generated for that carrier (e.g., for that first carrier). When all retrieved carriers have been processed and all transaction files have been ultimately generated for all respective producer codes, any particularly desired transaction files may be transmitted to any respective AMSs. Thereafter, if all desired transaction files have been respectively transmitted, the process may proceed to end all operations.

Figure 6:
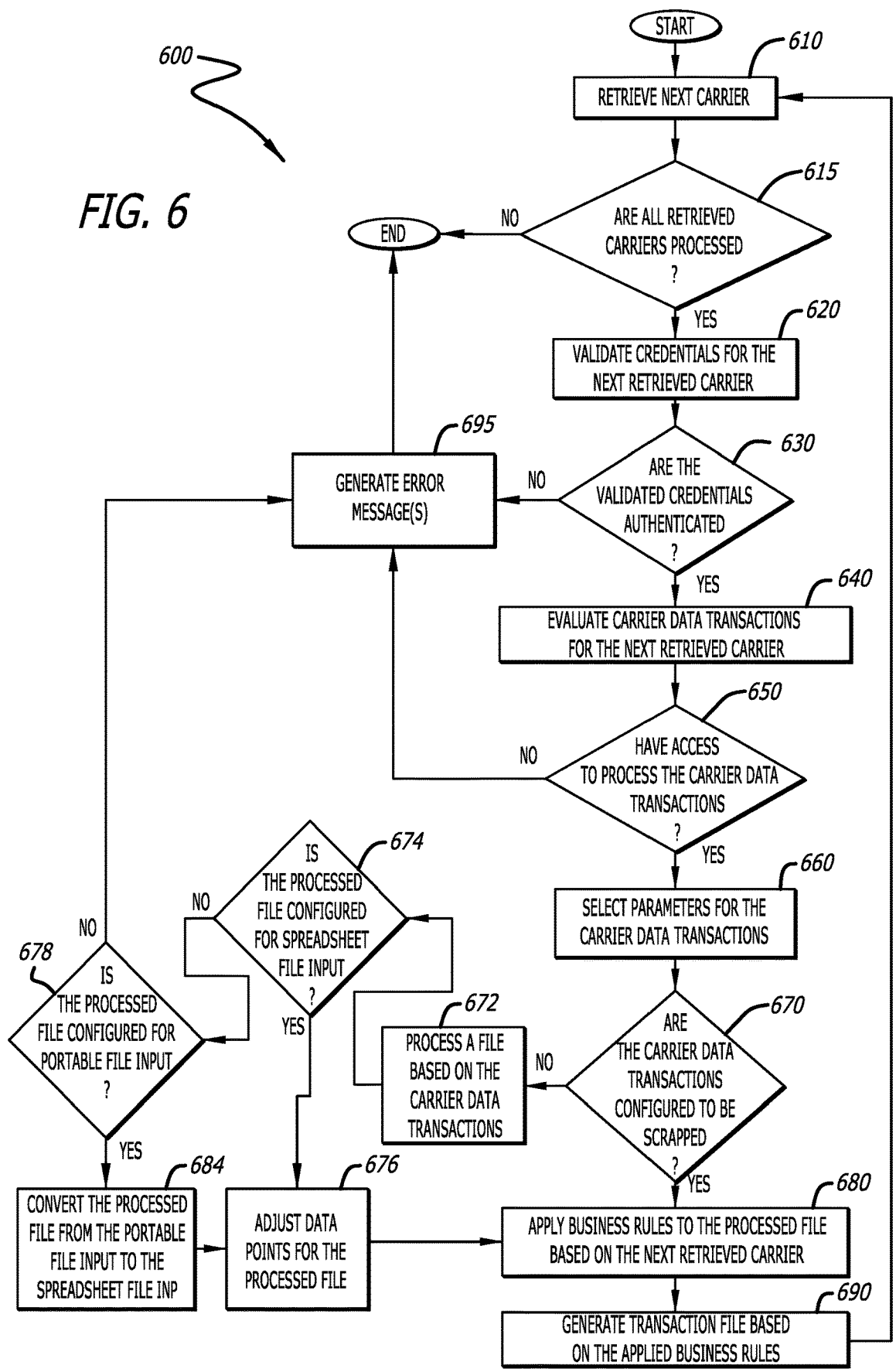
FIG. 6 is a detailed flowchart depicting a process for retrieving carrier data transactions from a plurality of carriers to optimize and reconcile carrier transactional data, in accordance with an embodiment of the present disclosure.

Referring now to FIG. 6, a detailed flowchart depicting a process 600 for retrieving and optimizing carrier data transactions is shown, in accordance with an embodiment of the present disclosure. The process 600 in FIG. 6 depicts in greater detail embodiments of one or more process flows related to the process 500 depicted above in FIG. 5. For example, the process 600 may be implemented for insurance systems such as an insurance agency/broker associated with an AMS that desires to perform any optimized retrieval and importation operations described herein to reconcile any carrier-related data transactions from one or more carriers of one or more CMSs. Furthermore, the process 600 may be implemented by a transactional data reconciliation device configured to facilitate any of the optimized retrieval and importation processes and operations described herein, which may particularly include, for example, retrieving carrier lists with their respective producer codes, validating the given credentials to gain access to any carrier-related data transactions and related data from the respective CMSs' webpages, and generating the desired transaction files based on applied carrier specific business rules, adjusted file data points, converted file input formats, and scrapped carrier data transactions. In most embodiments, the transactional data reconciliation device may be substantially similar to the transactional data reconciliation device 140 depicted in FIGS. 1-2.

At block 610, the process 600 may start and may retrieve a first (next) carrier from a list of carriers similar to the retrieved list of carriers depicted at block 510 in FIG. 5. For example, as described above, the process 600 may retrieve the next carrier and any producer codes associated with that next carrier. At block 615, the process 600 may determine whether all the retrieved carriers from the retrieved list have been processed. For example, the process 600 may proceed to end in response to determining that all retrieved carriers have been processed for their available carrier data transactions. However, in response to determining that the process 600 has retrieved the next carrier and that not all retrieved carriers have been processed, the process 600 may proceed to block 620 to validate one or more credentials for the next retrieved carrier.

For example, once the next carrier and respective producer codes are retrieved, the process 600 may attempt to login to one or more webpages associated with the CMS of the next carrier by entering credentials to gain access to the CMS's webpages. It should be noted that this step is often required to gain access to most transactional data and data points in most CMSs, but this step is not always required by all CMSs. At block 630, once the credentials have been entered, the process 600 may determine whether the entered credentials have been authenticated. In most embodiments, in response to determining that the credentials are not authenticated, the process 600 may proceed to block 695 and may generate an error message based on the entered credentials, such as generating and transmitting an "Invalid Credentials" error message to the respective AMS associated with the transactional data reconciliation device.

Likewise, in response to determining that the credentials have been authenticated, the process 600 may proceed to block 640 and may evaluate/process any desired carrier data transactions related to the next carrier. In some embodiments, the evaluation of the carrier data transactions may be similar to the one or more evaluation steps depicted at block 540 in FIG. 5. For example, the process 600 may be configured to automatically navigate through the CMS's webpages to a download section on one of the CMS's webpages, which may be used to process and load the desired carrier data transactions specific to the next carrier. At block 650, the process 600 may determine whether the transactional data reconciliation device has access to process the next carrier's data transactions. For example, the process 600 may determine whether the transactional data reconciliation device has access to process the desired carrier data transactions from the particular download section of the CMS's webpages.

In some embodiments, in response to determining that the particular download section may not be accessed, the process 600 may proceed to block 695 and may generate an error message based on the accessibility to the particular download section, such as generating and transmitting a "No Access" error message to the respective AMS associated with the transactional data reconciliation device. Likewise, in response to determining that the particular download section may be accessed, the process 600 may proceed to block 660 and may select one or more parameters to load the desired carrier data transactions of the next carrier. At block 670, once the parameters for loading the desired carrier data transactions have been selected, the process 600 may determine whether the desired carrier data transactions have been configured to be scrapped.

For example, a determination may be made to identify whether the desired carrier data transactions were loaded in an HTML table format on the respective CMS's webpage. In this example, one or more desired carrier data points for the next carrier may be processed if that data was loaded in the HTML table format on that CMS's webpage. In response to determining that the desired carrier data transactions are configured to be scrapped, the process 600 may proceed to block 680. However, in response to determining that the desired carrier data transactions are not configured to be scrapped, the process 600 may proceed to block 672 to process a carrier transactional data file based on the desired carrier data transactions. That is, once the determination is made that the data may not be directly scrapped, the process 600 may load the desired carrier data transactions as a file from the download section in the CMS's webpage.

At block 674, the process 600 may determine whether the processed carrier transactional data file is configured in a spreadsheet file input format. In response to determining that the processed carrier transactional data file is not configured in the spreadsheet file input format, the process 600 may proceed to block 678 to determine whether the processed carrier transactional data file is configured in a portable file input format. Furthermore, once the determination has been made that the processed carrier transactional data file is configured in the portable file input format, the process 600 may proceed to block 684 to convert the processed carrier transactional data file. For example, the process 600 may be configured to convert the next carrier's processed carrier transactional data file from the portable file input format to the spreadsheet file input format. Meanwhile, in response to determining that the processed carrier transactional data file is not configured in the portable file input format back at block 674, the process 600 may proceed to block 695 to generate an error message based on the invalid format of that processed file, such as generating and transmitting an "Invalid File" error message to the respective AMS associated with the transactional data reconciliation device.

At block 676, in response to determining that the processed carrier transactional data file is configured in the spreadsheet file input format, or similarly once that processed file was converted to the spreadsheet file input format, the process 600 may be configured to implement one or more desired file adjustments to the processed file. For example, the process 600 may adjust one or more data file inputs in the processed file, which may include adjusting the format of the data points loaded in the spreadsheet file input format. At block 680, in response to determining that the desired carrier data transactions may be scrapped back at block 670, or similarly once the carrier transactional data file was adjusted, the process 600 may apply one or more business rules to the processed carrier transactional data file, where the applied business rules may be configured as carrier specific business rules particularly related to the next carrier. Finally, at block 690, the process 600 may generate a transaction file for the next carrier based on the applied business rules and the processed carrier data transactions.

In some embodiments, once the transaction file for the next carrier has been generated at block 690, the process 600 may return back to block 610 to retrieve a second (next) carrier from the list of carriers and again process that next carrier and so on. As such, once all transaction files have been ultimately generated for all producer codes for all retrieved carriers, the process 600 may determine that all retrieved carriers from the list of carriers have been processed at block 615 and may then proceed to end. Similarly, in some embodiments, the process 600 may end once the respective error message has been generated at block 695. In addition, it should be understood that any generated transaction files may be further processed for output and then transmitted to any of the respective AMSs, without limitation.

Figure 7:
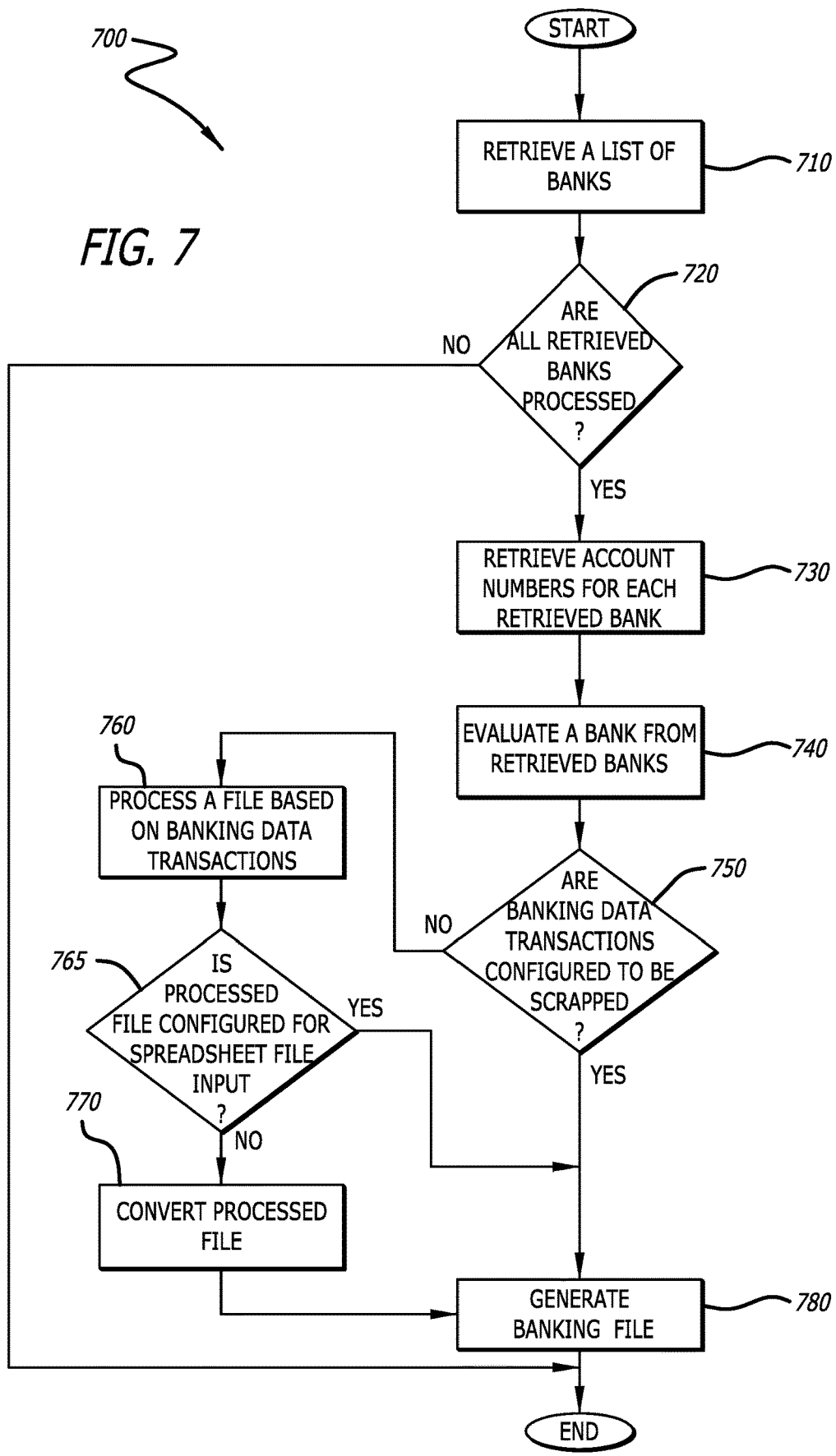
FIG. 7 is a flowchart depicting a banking transactions reconciliation process, in accordance with an embodiment of the present disclosure.

Referring now to FIG. 7, a flowchart depicting a banking transactional data reconciliation process 700 is shown, in accordance with an embodiment of the present disclosure. The process 700 in FIG. 7 depicts embodiments of one or more process flows described herein. For example, the process 700 may be implemented for insurance systems to perform one or more optimized retrieval and importation operations and any other data transactions retrieval and optimizing related operations. Furthermore, the process 700 may be implemented by a transactional data reconciliation device which may be configured to facilitate the various optimized retrieval and importation processes and operations described herein. For example, the process 700 may be configured to retrieve any banking-related data transactions from one or more banks associated with one or more financial institution systems, and to then generate banking files (or banking-related transactional data files) based on the retrieved data from the one or more respective banks of the one or more respective financial institution systems. In most embodiments, the transactional data reconciliation device may be substantially similar to the transactional data reconciliation device 140 depicted in FIGS. 1-2.

To start, the process 700 may retrieve a list of banks associated with one or more financial institution systems, where the list of banks may be a retrieved list having a first bank to any desired number bank (i.e., a $n^{th}$ bank). In many embodiments, the process 700 of retrieving banking data transactions (or banking-related data transactions) and generating banking files may be initiated when the list of banks is received by the transactional data reconciliation device at a scheduled predetermined time period. For example, as described above, the list of banks may be implemented as a search list for one or more banks that have been identified as needing banking data transactions loaded on that scheduled day, where the identified banks from the search list are then added to the list of banks. Furthermore, the transactional data reconciliation device may be optimized to self-generate the list of banks through one or more processes including one or more machine learning/AI based processes.

At block 720, once the list of banks is known, the process 700 may be initiated to retrieve and process banking data transactions from each bank in the retrieved list (i.e., each retrieved bank), such that the process 700 may be configured to then determine whether all banks from the retrieved list have been processed. For example, the process 700 may proceed to end in response to determining that all retrieved banks have been processed for their available banking data transactions (i.e., if zero banks are left in the retrieved list, the process 700 may end all operations). However, in response to determining that not all retrieved banks have been processed, the process 700 may proceed to block 730 to retrieve one or more account numbers associated with each bank in the retrieved list. For example, a list of account numbers may be retrieved for each bank from account number data within financial institution system data stored in the transactional data reconciliation device.

At block 740, the process 700 may evaluate a first bank from the retrieved banks. For example, the process 700 may be configured to evaluate a workflow specific to that first bank. The bank specific workflow may be configured as a list of general policies that directs the evaluating, scraping, and retrieving of data to occur in an organized and more efficient manner. For example, the process 700 may be automatically directed to load one or more webpages associated with the first bank, to validate credentials used to gain access to the bank's webpages, and to navigate through the webpages and gain access to a download section for retrieving the desired banking data transactions. Each webpage may be loaded through known browser resources such as utilizing a URL address and/or the like. The process 700 may be configured to automatically validate a set of credentials used to login to the respective webpages and gain access to many transactional data types and data points from the download section in one of the respective webpages. Once the first carrier has been evaluated, the process 700 may proceed to block 750 to determine whether the desired banking data transactions in the download section are configured to be scrapped. For example, a determination may be made to identify whether the desired banking data transactions were loaded in an HTML table format on the respective webpage. In this example, once the banking data transactions have been loaded, one or more desired banking data points may be processed if that data was loaded in the HTML table format on that webpage. In many embodiments, the processing of these data points may be simply to scrape the respective formatted data directly from the webpage.

In response to determining that the desired banking data transactions are not configured to be scrapped, the process 700 may proceed to block 760 to process a banking transactional data file based on the desired banking data. At block 765, the process 700 may determine whether the processed banking transactional data file is configured in the form of a spreadsheet file input format, such as an Excel file input format and/or any other similar spreadsheet file input format. In response to determining that the processed banking transactional data file is not configured in the spreadsheet file input format, the process 700 may proceed to block 770 to convert the processed banking transactional data file to a spreadsheet file input format. For example, if a processed transactional data file is configured in a portable file input format such as a PDF file input format and/or any other similar portable file input format, a file conversion logic of the transactional data reconciliation device may be configured to convert the processed transactional data file to the spreadsheet file input format.

Referring back to block 750, in response to determining that the desired banking data transactions are configured to be scrapped, the process 700 may proceed to block 780. Similarly, in response to determining that the processed banking transactional data file is configured in the spreadsheet file input format at block 765, and/or once the processed bank transactional data file has been converted at block 770, the process 700 may also proceed to block 780. Accordingly, at block 780, the process 700 may be configured to generate a banking file based on at least one or more of the scrapped data, converted banking transactional file input data, and/or any other related importation operations such as adjusting one or more file input data points, applying one or more bank specific business rules, and so on.

In additional embodiments, the transactional data reconciliation device may be configured to further process the generated banking files for output to one or more AMSs, once all banking files have been generated for all account numbers provided by all retrieved banks. That is, if other banks from the retrieved list remain to be processed, the process 300 depicted in FIG. 3 may be configured to return back and again load and process a next bank, once all banking files have been generated for that bank (e.g., for that first bank). When all retrieved banks have been processed and all banking files have been ultimately generated for all respective account numbers, any particularly desired banking files may be transmitted to any respective AMSs. Thereafter, if all desired banking files have been respectively transmitted, the process may proceed to end all operations.

Figure 8:
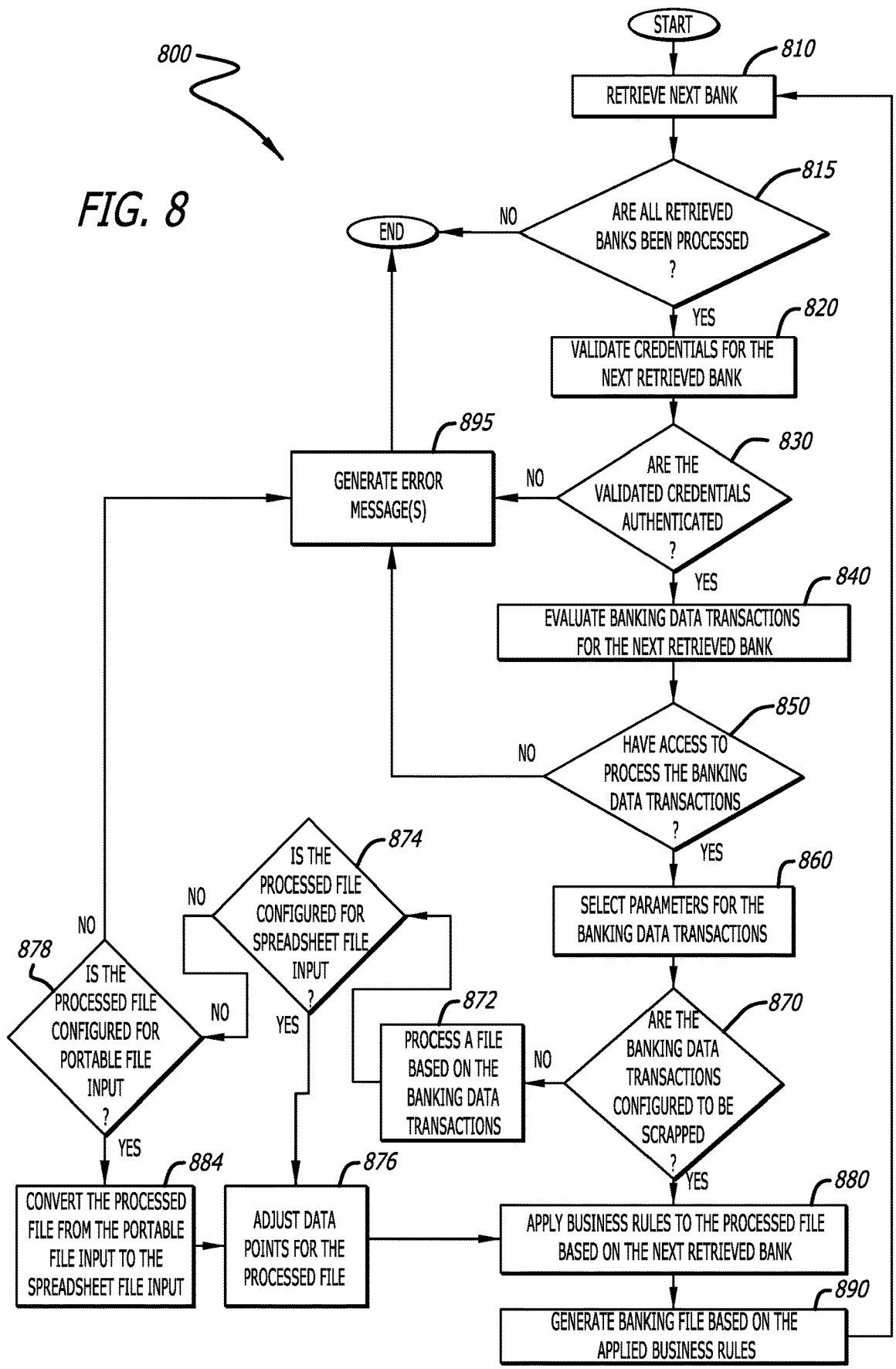
FIG. 8 is a detailed flowchart depicting a process for retrieving banking data transactions from a plurality of financial institutions to optimize and reconcile banking transactional data, in accordance with an embodiment of the present disclosure.

Referring now to FIG. 8, a detailed flowchart depicting a process 800 for retrieving and optimizing banking data transactions is shown, in accordance with an embodiment of the present disclosure. The process 800 in FIG. 8 depicts in greater detail embodiments of one or more process flows related to the process 700 depicted above in FIG. 7. For example, the process 800 may be implemented for insurance systems such as an insurance agency/broker associated with an AMS that desires to perform any optimized retrieval and importation operations described herein to reconcile any banking-related data transactions from one or more banks associated with one or more financial institution systems. Furthermore, the process 800 may be implemented by a transactional data reconciliation device configured to facilitate any of the optimized retrieval and importation processes and operations described herein, which may particularly include, for example, retrieving bank lists with their respective account numbers, validating the given credentials to gain access to any banking data transactions and related data from the respective financial institution systems' webpages, and generating the desired banking files based on applied bank specific business rules, adjusted file data points, converted file input formats, and scrapped banking data. In most embodiments, the transactional data reconciliation device may be substantially similar to the transactional data reconciliation device 140 depicted in FIGS. 1-2.

At block 810, the process 800 may start and may retrieve a first (next) bank from a list of banks similar to the retrieved list of banks depicted at block 710 in FIG. 7. For example, as described above, the process 800 may retrieve the next bank and any account numbers associated with that next bank. At block 815, the process 800 may determine whether all the retrieved banks from the retrieved list have been processed. For example, the process 800 may proceed to end in response to determining that all retrieved banks have been processed for their available banking data transactions. However, in response to determining that the process 800 has retrieved the next bank and that not all retrieved banks have been processed, the process 800 may proceed to block 820 to validate one or more credentials for the next retrieved bank.

For example, once the next bank and respective account numbers are retrieved, the process 800 may attempt to login to one or more webpages associated with the next bank by entering credentials to gain access to the bank's webpages. It should be noted that this step is often required to gain access to most transactional data and data points in most banks, but this step is not always required by all banks. At block 830, once the credentials have been entered, the process 800 may determine whether the entered credentials have been authenticated. In most embodiments, in response to determining that the credentials are not authenticated, the process 800 may proceed to block 895 and may generate an error message based on the entered credentials, such as generating and transmitting an "Invalid Credentials" error message to the respective AMS associated with the transactional data reconciliation device.

Likewise, in response to determining that the credentials have been authenticated, the process 800 may proceed to block 840 and may evaluate/process any desired banking data transactions related to the next bank. In some embodiments, the evaluation of the banking data transactions may be similar to the one or more evaluation steps depicted at block 740 in FIG. 7. For example, the process 800 may be configured to automatically navigate through the bank's webpages to a download section on one of the bank's webpages, which may be used to process and load the desired banking data transactions specific to the next bank. At block 850, the process 800 may determine whether the transactional data reconciliation device has access to process the next bank's banking data transactions. For example, the process 800 may determine whether the transactional data reconciliation device has access to process the desired banking data transactions from the particular download section of the bank's webpages.

In some embodiments, in response to determining that the particular download section may not be accessed, the process 800 may proceed to block 895 and may generate an error message based on the accessibility to the particular download section, such as generating and transmitting a "No Access" error message to the respective AMS associated with the transactional data reconciliation device. Likewise, in response to determining that the particular download section may be accessed, the process 800 may proceed to block 860 and may select one or more parameters to load the desired banking data transactions of the next bank. At block 870, once the parameters for loading the desired banking data transactions have been selected, the process 800 may determine whether the desired banking data transactions have been configured to be scrapped.

For example, a determination may be made to identify whether the desired banking data transactions were loaded in an HTML table format on the respective bank's webpage. In this example, one or more desired banking data points for the next bank may be processed if that data was loaded in the HTML table format on that bank's webpage. In response to determining that the desired banking data transactions are configured to be scrapped, the process 800 may proceed to block 880. However, in response to determining that the desired banking data transactions are not configured to be scrapped, the process 800 may proceed to block 872 to process a banking transactional data file based on the desired banking data transactions. That is, once the determination is made that the data may not be directly scrapped, the process 800 may load the desired banking data transactions as a file from the download section in the bank's webpage.

At block 874, the process 800 may determine whether the processed banking transactional data file is configured in a spreadsheet file input format. In response to determining that the processed banking transactional data file is not configured in the spreadsheet file input format, the process 800 may proceed to block 878 to determine whether the processed banking transactional data file is configured in a portable file input format. Furthermore, once the determination has been made that the processed banking transactional data file is configured in the portable file input format, the process 800 may proceed to block 884 to convert the processed banking transactional data file. For example, the process 800 may be configured to convert the next bank's processed banking transactional data file from the portable file input format to the spreadsheet file input format. Meanwhile, in response to determining that the processed banking transactional data file is not configured in the portable file input format back at block 874, the process 800 may proceed to block 895 to generate an error message based on the invalid format of that processed file, such as generating and transmitting an "Invalid File" error message to the respective AMS associated with the transactional data reconciliation device.

At block 876, in response to determining that the processed banking transactional data file is configured in the spreadsheet file input format, or similarly once that processed file was converted to the spreadsheet file input format, the process 800 may be configured to implement one or more desired file adjustments to the processed file. For example, the process 800 may adjust one or more data file inputs in the processed file, which may include adjusting the format of the data points loaded in the spreadsheet file input format. At block 880, in response to determining that the desired banking data transactions may be scrapped back at block 870, or similarly once the banking transactional data file was adjusted, the process 800 may apply one or more business rules to the processed banking transactional data file, where the applied business rules may be configured as bank specific business rules particularly related to the next bank. Finally, at block 890, the process 800 may generate a banking file for the next bank based on the applied business rules and the processed banking data transactions.

In some embodiments, once the banking file for the next bank has been generated at block 890, the process 800 may return back to block 810 to retrieve a second (next) bank from the list of banks and again process that next bank and so on. As such, once all banking files have been ultimately generated for all account numbers for all retrieved banks, the process 800 may determine that all retrieved banks from the list of banks have been processed at block 815 and may then proceed to end. Similarly, in some embodiments, the process 800 may end once the respective error message has been generated at block 895. In addition, it should be understood that any generated banking files may be further processed for output and then transmitted to any of the respective AMSs, without limitation.

Referring now to FIG. 9, a high-level flowchart depicting a process 900 for utilizing machine learning (ML) processes in conjunction with a transactional data reconciliation system/device is shown, in accordance with an embodiment of the present disclosure. The process 900 depicted in FIG. 9 may be implemented with any retrieval and importation processes and any related operations described herein. In particular, the process 900 may be implemented to provide more efficient optimized retrieving/optimizing processes that help to maintain any AMS transactional data related data current with both CMS and bank transactional data related data. ML/AI processes may facilitate this by fine-tuning such processes of the AMSs, CMSs, and/or financial institution systems described herein.

One example use of ML/AI data processing in conjunction with a transactional data reconciliation system may be depicted by the process 900 in FIG. 9. Furthermore, the process 900 may be configured to operate with a transactional data reconciliation device. The transactional data reconciliation device may be configured to utilize ML/AI processes to ensure a higher degree of data quality to thereby create better and more accurate reporting on key business metrics, and to also build one or more predictive models with any transactional related data to thereby enhance customer engagement, alert when customers may appear to drop off from their policies, and increase customer retention. The transactional data reconciliation system and device depicted in FIG. 9 may be substantially similar to the transactional data reconciliation system 100 depicted in FIG. 1 and the transactional data reconciliation device 140 depicted in FIGS. 1-2.

At block 910, the process 900 may deploy one or more ML logics. For example, the ML logics may include any type of ML/AI logics that may be incorporated with one or more of the logics of the transactional data reconciliation device 140 depicted in FIG. 2. However, in certain embodiments, the ML/AI logics may be deployed but may be activated separately and/or in response to one or more conditions/predetermined thresholds being met, such as a software, hardware upgrade, and/or the like. Once available, the ML/AI logics may begin to focus the optimized retrieval and importation of specific transactional data points to ensure enhanced data quality and better customer experiences.

At block 920, in order to generate inferences or other informed predictions, the process 900 may evaluate any current data (or sets of data transactions) within the transactional data reconciliation device. For example, the process 900 may evaluate the current data associated with the transactional data types and data points within the transactional data reconciliation device. Moreover, in some embodiments, the initial data needed to operate the ML/AI processes may be provided as a preconfigured weight set summarized within an anonymized set of training data, which may or may not be associated with the current data within the transactional data reconciliation device. In other embodiments, one or more manual inputs may be submitted to generate a set of initial ground truth data points for the ML/AI processes to initially utilize as the current data.

At block 930, once configured, the process 900 determines a plurality of potentially stale data points (or data transaction data points) from the evaluated current data. For example, the ML/AI processes may be configured to make certain determinations that may generate increased efficiency within the transactional data reconciliation device. In several embodiments, the ML/AI processes may be configured within any of the available logics in the memory of the transactional data reconciliation device that may be configured to evaluate each of the data points and their data entries and each of the data types within any of the available data types in the data store of the transactional data reconciliation device, which may be further configured (as described below) to generate at least a probability that is associated with the likelihood that the data point is a potentially stale data point. For example, the potentially stale data point may include data points that may be currently incorrect or otherwise out of date (i.e., "stale"), otherwise non-current, constantly reoccurring (i.e., highly expected), potentially alerting, and so on. In this way, the ML/AI processes may be utilized to exclude and/or limit the data sought through the retrieval and reconciliation processes. Furthermore, the ML/AI based processes may be further enhanced by generating ground truth data based on the results of the retrieval and reconciliation processes, which may be used within a closed loop to retrain the one or more ML/AI processes associated with the transactional data reconciliation device (e.g., via a reweighting of a model, etc.).

As such, at block 930, the process 900 may be configured to determine and identify any potentially stale data points from the evaluated transactional data, including but not limited to, any potentially stale and/or otherwise non-current data points, any potentially warning data points triggered by one or more predetermined alert thresholds (e.g., alert thresholds related to customer payment information data points, such as any predetermined number of missed payments and so on), any potentially reoccurring and/or constant discrepancies in the data points, etc. The one or more determinations may be based on a number of factors including, but are not limited to, the type of data evaluated (e.g., billing info tends to change more frequently than dates of birth, etc.), the time since the last update (e.g., updates to billing payments are not likely to change in under one month), the data types and points correlated with improved customer experiences, and/or the overall history of the policy (e.g., younger customers are more likely to change data compared to older customers). The determination of stale validated data points may occur as frequently or infrequently as required by the desired application. Based on these types of evaluations and determinations, a probability may be determined on each determined data point to indicate potential data that may be updated.

At block 940, once one or more stale data points have been determined, the process 900 may generate transactional data that should be retrieved for further review and accuracy verification, where the generated transactional data may be based on the transactional data stored within the transactional data reconciliation device. For example, as opposed to embodiments where a list of transactional data and data points to review/verify are simply received by the transactional data reconciliation device, the ML/AI processes may internally generate transactional data points to further review and verify. This helps to increase system efficiency by anticipating and optimizing the verification of transactional related data from any CMSs and/or financial institution systems. Once generated, the generated transactional data lists may be utilized by the transactional data reconciliation device and/or may be transmitted to another device.

At block 950, the process 500 may then process the generated transactional data. In various embodiments, this may be accomplished in a manner similar to any of the operations discussed above with respect to FIGS. 3-8. At block 960, during or after processing the generated transactional data, the process 900 may reconcile (and/or retrieve) one or more transactional data points that have been updated and/or verified. Once retrieved, the ML/AI processes may compare the recently reconciled data from the transactional data points with the determined probability associated with that particular data point. In response to the comparisons, a determination may be made based on the accuracy of the determined probability. At block 970, the process 900 may ultimately update the one or more ML/AI logics based on the comparisons implemented between the determined probability of the actual data points from the transactional data related data. As those skilled in the art will understand, it should be understood that any determinations of any correct inferences and/or predictions made by the ML/AI processes may be configured to strengthen the relative associations (i.e., weights) with those determinations, while an incorrect inference/prediction may have the opposite effect, without limitations. In certain embodiments, the various operations related to the ML/AI processes may be optimized processes. However, other embodiments may provide a process for ground truth generation by allowing a user, such as an agent/broker, to verify the correctness of the scraped data. This process may continue the training process of the one or more ML/AI processes within the transactional data reconciliation system and device.

Information as shown and described in detail herein is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail may be made, without departing from the spirit and scope of the present disclosure, as set forth in the appended claims, as might be apparent to those of ordinary skill in the art, are also encompassed by the present disclosure.

What is claimed is:

1. A data reconciliation device, comprising:
   a processor; and
   a non-transitory computer-readable medium communicatively coupled to the processor, the medium further comprising:
      data retrieval logic, processed by the processor, configured to:
         retrieve a list of a plurality of carriers for processing, wherein each of the plurality of carriers are associated with one or more carrier servers;
         retrieve one or more producer codes for each of the plurality of carriers from the list of carriers; and
         retrieve, at a predetermined time interval, a plurality of data transactions from a carrier file generated by each producer code of each of the plurality of carriers, wherein the carrier file is a third party webpage comprising at least commission data transactions and carrier data transactions;
      data scraping logic, processed by the processor, configured to process a transactional data file based on the plurality of retrieved data transactions from the carrier file;
      data reconciliation logic, processed by the processor, configured to:
         apply one or more carrier specific business rules to the processed transactional data file; and
         generate a carrier transactional data file for each of the plurality of carriers based on the applied carrier specific business rules, wherein the generated carrier transactional data file comprises at least one of a commission file and a transaction file.

2. The transactional data reconciliation device of claim 1, wherein the applied carrier specific business rules are configured to be specific to each carrier from the retrieved list of carriers.

3. The transactional data reconciliation device of claim 1, wherein the non-transitory computer-readable medium further includes a validation logic, a parameter selection logic, an error generation logic, and a file conversion logic.

4. The transactional data reconciliation device of claim 1, wherein the data retrieval logic is configured to process all retrieved data transactions from all carrier files that are provided by all carriers from the retrieved list of carriers.

5. The transactional data reconciliation device of claim 4, wherein the data retrieval logic is further configured to parse all retrieved data transactions by retrieving one or more data points for further processing based on the determined probability associated with that one or more data points.

6. The transactional data reconciliation device of claim 3, wherein the validation logic is configured to transmit credential data to the one or more respective carrier servers for authentication.

7. The transactional data reconciliation device of claim 6, wherein, in response to transmitting the credential data, the validation logic is configured to authenticate the credential data via the one or more respective carrier servers to gain access to one or more download sections associated with the respective carrier servers.

8. The transactional data reconciliation device of claim 7, wherein the download sections from the respective carrier servers are utilized to process the transactional data file that is associated with the retrieved data transactions.

9. The transactional data reconciliation device of claim 8, prior to processing the transactional data file, the parameter selection logic is configured to enter one or more parameters to load the processed transactional data file from the respective download section of the respective carrier server.

10. The transactional data reconciliation device of claim 3, wherein the file conversion logic is configured to convert the processed transactional data file from a portable file format to a spreadsheet file format in response to determining that the processed transactional data file is configured in the portable file format.

11. The transactional data reconciliation device of claim 10, wherein the file conversion logic is further configured to adjust one or more data file inputs associated with the processed transactional data file or the converted transactional data file that is configured in the spreadsheet file format.

12. The transactional data reconciliation device of claim 1, further comprising a communication interface configured in conjunction with the data reconciliation logic to transmit the generated carrier transactional data file to at least one or more agency management systems (AMSs).

13. The transactional data reconciliation device of claim 1, wherein the one or more carrier servers are associated with at least one or more carrier management systems (CMSs).

14. A method for retrieving and optimizing data with a transactional data reconciliation device, the method comprising:
retrieving, via a data retrieval logic within the data reconciliation device:
a list of carriers for processing, wherein the plurality of carriers are associated with one or more carrier servers;
one or more producer codes for each carrier from the list of carriers; and
a plurality of data transactions from a carrier file generated by each producer code of each carrier, wherein the carrier file comprises commission data transactions and carrier data transactions;
validating, via a validation logic within the reconciliation device, credential data associated with each of the carrier servers, wherein the credential data is transmitted to each of the carrier servers to gain access to one or more download sections associated with each carrier;
entering, via a parameter selection logic within the reconciliation device, one or more selected parameters in the respective download section associated with the plurality of retrieved data transactions from the carrier file;
processing, via a data scraping logic within the reconciliation device, a transactional data file based on the entered parameters and the plurality of retrieved data transactions;
utilizing a data reconciliation logic within the reconciliation device to:
apply one or more carrier specific business rules to the processed transactional data file, wherein the applied carrier specific business rules are configured to be personalized to each carrier from the retrieved list of carriers; and
generate a carrier transactional data file for each of the plurality of carriers based on the applied carrier specific business rules, wherein the generated carrier transactional data file comprises at least one of a commission file and a transaction file.

15. The method of claim 14, wherein the transactional data reconciliation device comprises a processor communicatively coupled to a non-transitory computer-readable medium, and wherein the non-transitory computer-readable medium includes a data retrieval logic, a validation logic, a parameter selection logic, a data scrapping logic, an error generation logic, a file conversion logic, and a data reconciliation logic.

16. The method of claim 15, wherein the data retrieval logic is configured to process all retrieved data transactions from all carrier files that are provided by all carriers from the retrieved list of carriers, and wherein the data retrieval logic is further configured to parse all retrieved data transactions by retrieving one or more data points for further processing based on the determined probability associated with that one or more data point.

17. The method of claim 15, wherein the file conversion logic is configured to convert the processed transactional data file from a portable file format to a spreadsheet file format in response to determining that the processed transactional data file is configured in the portable file format, and wherein the file conversion logic is further configured to adjust one or more data file inputs associated with the processed transactional data file or the converted transactional data file that is configured in the spreadsheet file format.

18. The method of claim 15, wherein the transactional data reconciliation device further comprises a communication interface communicatively coupled to both the processor and non-transitory computer-readable medium, and wherein the communication interface is configured in conjunction with the data reconciliation logic to transmit the generated carrier transactional data file to at least one or more AMSs.

19. The method of claim 14, wherein the one or more carrier servers are associated with at least one or more CMSs.

20. An agency data reconciliation device, comprising:
a processor; and
a non-transitory computer-readable medium communicatively coupled to the processor, the medium further comprising:
data retrieval logic, processed by the processor, configured to:
retrieve a list of entities for processing, wherein the entities comprise at least one or more carriers and financial institutions, wherein each of the one or more carriers are associated with one or more carrier servers, and wherein the financial institutions are associated with one or more financial institution servers; and retrieve one or more identification numbers for each entity from the list of entities, wherein the one or more identification numbers comprise producer codes and account numbers;

validation logic, processed by the processor, configured to validate credential data associated with each of the respective servers, wherein the credential data is transmitted to each of the respective servers to gain access to one or more download sections associated with each entity;

data retrieval logic, processed by the processor, configured to retrieve a plurality of data transactions from an entity file generated by each identification number of each entity, wherein the entity file comprises at least one or more commission data transactions, carrier data transactions, and banking data transactions;

parameter selection logic, processed by the processor, configured to enter one or more selected parameters in the respective download section associated with the plurality of retrieved data transactions from the entity file;

data scraping logic, processed by the processor, configured to process a transactional data file based on the plurality of retrieved data transactions from the entity file;

data reconciliation logic, processed by the processor, configured to apply one or more entity specific business rules to the processed transactional data file; and generate an entity transactional data file for each of the one or more carriers based on the applied entity specific business rules, wherein the generated entity transactional file comprises at least one of a commission file, a transaction file, and a banking file.

* * * * *